US010845481B2

(12) United States Patent
Pierce et al.

(10) Patent No.: US 10,845,481 B2
(45) Date of Patent: Nov. 24, 2020

(54) SCANNING RANGE FINDER

(71) Applicant: iRobot Corporation, Bedford, MA (US)

(72) Inventors: Travis Pierce, Bedford, NH (US); Jamie Milliken, Waltham, MA (US); Marc Wilga, Pelham, NH (US)

(73) Assignee: iRobot Corporation, Bedford, MA (US)

( * ) Notice: Subject to any disclaimer, the term of this patent is extended or adjusted under 35 U.S.C. 154(b) by 275 days.

(21) Appl. No.: 16/012,097

(22) Filed: Jun. 19, 2018

(65) Prior Publication Data

US 2018/0299550 A1 Oct. 18, 2018

Related U.S. Application Data

(62) Division of application No. 14/529,815, filed on Oct. 31, 2014, now Pat. No. 10,024,964.

(Continued)

(51) Int. Cl.
  *G01S 17/06* (2006.01)
  *G01S 17/42* (2006.01)
  (Continued)

(52) U.S. Cl.
  CPC ........... *G01S 17/06* (2013.01); *A01D 34/008* (2013.01); *G01S 7/4816* (2013.01); *G01S 7/4817* (2013.01);
  (Continued)

(58) Field of Classification Search
  CPC . G01S 17/00; G01S 17/10; G01S 7/48; G01S 7/483
  See application file for complete search history.

(56) References Cited

U.S. PATENT DOCUMENTS

| 5,187,663 A | 2/1993 | Kamimura et al. |
| 5,461,473 A * | 10/1995 | Pratt ................... G01C 15/002 |
| | | 250/206.1 |

(Continued)

FOREIGN PATENT DOCUMENTS

| CN | 101932953 | 12/2010 |
| CN | 102803988 | 11/2012 |

(Continued)

OTHER PUBLICATIONS

European Office Action in corresponding European Application No. 14858770.2 (12 pages) (dated Sep. 6, 2017).

(Continued)

*Primary Examiner* — Luke D Ratcliffe
(74) *Attorney, Agent, or Firm* — Fish & Richardson P.C.

(57) ABSTRACT

A scanning optical range finder in a mobile robot includes an optical emitter circuit, a non-imaging optical element, an optical detector circuit, and a ranging circuit. The non-imaging optical element is arranged to receive optical signals at an entrance aperture thereof responsive to operation of the optical emitter circuit, and to direct the optical signals to an output aperture thereof. The optical detector circuit is configured to receive the optical signals from the output aperture of the non-imaging optical element, and to generate detection signals based on respective phase differences of the optical signals relative to corresponding outputs of the optical emitter circuit. The ranging circuit is configured to calculate a range of a target from the phase differences indicated by the detection signals. Related devices and methods of operation are also discussed.

20 Claims, 15 Drawing Sheets

Related U.S. Application Data

(60) Provisional application No. 61/899,045, filed on Nov. 1, 2013.

(51) Int. Cl.
    *G01S 7/481*     (2006.01)
    *G01S 17/10*     (2020.01)
    *G01S 17/36*     (2006.01)
    *G01S 7/497*     (2006.01)
    *A01D 34/00*     (2006.01)
    *G01S 17/89*     (2020.01)

(52) U.S. Cl.
    CPC .............. *G01S 7/497* (2013.01); *G01S 17/10* (2013.01); *G01S 17/36* (2013.01); *G01S 17/42* (2013.01); *G01S 17/89* (2013.01); *Y10S 901/47* (2013.01)

(56) References Cited

U.S. PATENT DOCUMENTS

| | | | |
|---|---|---|---|
| 5,548,397 | A | 8/1996 | Kool et al. |
| 8,417,383 | B2 | 4/2013 | Ozick et al. |
| 8,515,578 | B2 | 8/2013 | Chiappetta et al. |
| 2003/0020895 | A1* | 1/2003 | Bridges ................ G01S 7/4812 356/4.01 |
| 2004/0135992 | A1* | 7/2004 | Munro .................... G01S 17/10 356/4.01 |
| 2008/0109126 | A1 | 5/2008 | Sandin et al. |
| 2011/0188028 | A1* | 8/2011 | Hui ...................... G01S 17/894 356/5.01 |

FOREIGN PATENT DOCUMENTS

| | | |
|---|---|---|
| DE | 102006001964 | 7/2007 |
| EP | 1562055 | 8/2005 |
| GB | 2277152 | 10/1994 |
| GB | 2386969 | 10/2003 |
| JP | H11 258339 | 9/1999 |
| JP | 2001-012906 | 1/2001 |
| JP | 2002-511945 | 4/2002 |
| WO | 2007/109624 | 9/2007 |
| WO | 2011/108210 | 9/2011 |

OTHER PUBLICATIONS

European Search Report in corresponding European Application No. 14858770.2 (9 pages) (dated Aug. 22, 2017).

Notification of Transmittal of the International Search Report and the Written Opinion of the International Searching Authority, or the Declaration in corresponding PCT Application No. PCT/US2014/063403 (12 pages) (dated Feb. 13, 2015).

Notification Concerning Transmittal of Copy of International Preliminary Report on Patentability in corresponding PCT Application No. PCT/US2014/063403 (8 pages) (dated May 12, 2016).

Partial Supplementary European Search Report in corresponding European Application No. 14858770.2 (10 pages) (dated Apr. 7, 2017).

Chinese Office Action in corresponding Chinese Application No. 201480072074.4 (Foreign text, 12 pages, English translation, 15 pages) (dated Feb. 24, 2018).

* cited by examiner

SCANNING RANGE FINDER

CLAIM OF PRIORITY

The present application is a divisional of U.S. application Ser. No. 14/529,815, filed Oct. 31, 2014, which claims the benefit of and priority from U.S. Provisional Patent Application No. 61/899,045, entitled "SCANNING RANGE FINDER," filed Nov. 1, 2013, the disclosures of each are incorporated by reference herein in its entirety.

TECHNICAL FIELD

The present disclosure relates scanning optical range finders. In particular, systems and methods related to scanning optical range finders in mobile robots are described herein, such as lawn mowing robots and remote telepresence robots.

BACKGROUND

Laser range finders may measure a distance to an object based on the propagation speed of light output from the laser. A typical laser rangefinder operates based on the time of flight principle, by sending a laser pulse in a narrow beam towards a target, and measuring the time taken by the pulse to be reflected from the target and returned to the sender. The propagation speed of light in air is relatively unaffected by temperature, humidity, etc. In contrast with sonar, a collimated laser beam can allow for measurements to a precisely known location. Such measurements using the speed of light can be very fast, but may also require fast detector electronics for accurate measurements.

Laser range finders may also operate based on the indirect time of flight or phase shift method, by sending a laser beam with sinusoidally modulated optical power to a target. Reflected light (from diffuse or specular reflections) is monitored, and the phase of the power modulation is compared with that of the sent light. The phase shift obtained may be 2π times the time of flight times the modulation frequency, illustrating that that higher modulation frequencies can result in a higher spatial resolution.

SUMMARY

According to some embodiments, a scanning optical range finder in a mobile robot includes an optical emitter circuit, a non-imaging optical element, an optical detector circuit, and a ranging circuit. The non-imaging optical element is arranged to receive distinct optical signals at an entrance aperture thereof responsive to operation of the optical emitter circuit, and to direct the optical signals to an output aperture thereof. The optical detector circuit is configured to receive the optical signals from the output aperture of the non-imaging optical element, and to generate respective detection signals based on respective phase differences of the optical signals relative to corresponding outputs of the optical emitter circuit. The ranging circuit is configured to calculate a plurality of distances from the phase differences indicated by the detection signals, and to identify one of the plurality of distances as the range of a target.

In some embodiments, the non-imaging optical element may be a compound parabolic collector element. The robot may further include a rotatable turret including collection optics that are arranged to direct the optical signal to the compound parabolic collector element responsive to rotation of the turret. The compound parabolic collector element may include a parabolic surface defining the entrance and output apertures at opposing ends thereof, and a flange extending around a periphery of the parabolic surface adjacent the entrance aperture thereof. The flange may have a greater diameter than the entrance aperture and may define a lip protruding from the parabolic surface.

In some embodiments, the optical emitter circuit may be configured to sequentially switch the outputs thereof between different frequencies during the rotation of the turret.

In some embodiments, the optical emitter circuit may be configured to dynamically alter a power level of the outputs thereof during the rotation of the turret.

In some embodiments, the optical signals may have different frequencies. The ranging circuit may be configured to calculate the range of the target based on a comparison of the plurality of distances indicated by the respective detection signals.

In some embodiments, the optical detector circuit may include an averaging detector configured to output the respective detection signals representing average voltages based on the respective phase differences. The ranging circuit may be configured to calculate, for the respective detection signals, a plurality of distances from the average voltages thereof, and to identify the one of the plurality of distances as the range of the target based on a least common multiple thereof.

In some embodiments, the optical emitter circuit may be configured to provide a phase shift between the respective outputs thereof.

In some embodiments, the ranging circuit may be configured to determine a time delay between transmission of one of the outputs from the optical emitter circuit and arrival of a corresponding one of the optical signals at the optical detector circuit, and to identify the one of the plurality of distances as the range of the target based on the time delay.

In some embodiments, the outputs from the optical emitter may respectively include a plurality of gated bursts. The ranging circuit may be configured to determine a time of the arrival of the one of the optical signals based on a signal strength of a burst thereof exceeding a threshold.

In some embodiments, the ranging circuit may be configured to extrapolate a rising edge of the burst of the one of the optical signals from the signal strength thereof to determine the time of the arrival. For example, the optical detector circuit may be configured to calculate a received signal strength indicator (RSSI) signal indicating the signal strength and to sample a received signal strength indicator (RSSI) noise floor to define the threshold, and the ranging circuit may be configured to extrapolate a time of the rising edge of the burst based on a rise time of the RSSI signal relative to the RSSI noise floor.

In some embodiments, the averaging detector may be configured to output the respective detection signals representing the average voltages responsive to input signals thereto that are forced to a predetermined state.

In some embodiments, the optical emitter circuit may include a programmable frequency clock coupled to an optical emitter. The optical emitter circuit may be configured to vary a frequency of the clock when the optical emitter is pointed at a fixed distance calibration target to output a plurality of calibration signals therefrom at respective frequencies, and may be configured to dynamically adjust the clock to one of the respective frequencies corresponding to one of the calibration signals having a highest received signal strength indicated by the optical detector circuit.

In some embodiments, the one of the respective frequencies may correspond to a center frequency of a band pass filter included in the optical detector circuit.

In some embodiments, the respective frequencies may include a current frequency of the clock, a frequency greater than the current frequency, and a frequency less than the current frequency. The optical emitter circuit may be configured to set the frequency of the clock during operation of the mobile robot.

According to further embodiments, in a method of operating a non-imaging optical range finder circuit, distinct ranging signals are transmitted from an optical emitter circuit, and, in response to the transmission, respective optical signals are received at an optical detector circuit via a non-imaging optical element. Respective detection signals are generated based on respective phase differences of the optical signals received at the optical detector circuit relative to the corresponding ranging signals transmitted from the optical emitter circuit. A plurality of distances are calculated from the phase differences indicated by the detection signals, and one of the plurality of distances is identified as a range of a target.

In some embodiments, the optical signals may have different frequencies. The range of the target may be calculated by comparing the plurality of distances indicated by the respective detection signals.

In some embodiments, the respective detection signals may represent average voltages based on the respective phase differences. In comparing the respective detection signals, the plurality of distances may be calculated from the average voltages thereof, and the one of the plurality of distances may be identified as the range of the target based on a least common multiple thereof.

In some embodiments, the respective ranging signals may be transmitted from the optical emitter circuit by sequentially switching between the different frequencies.

In some embodiments, a time delay between transmission of one of the ranging signals from the optical emitter circuit and arrival of a corresponding one of the optical signals at the optical detector circuit may be determined, and the one of the plurality of distances may be identified as the range of the target based on the time delay.

In some embodiments, the ranging signals from the optical emitter may respectively include a plurality of gated bursts, and a time of the arrival of the one of the optical signals may be determined based on a signal strength of a burst thereof exceeding a threshold.

In some embodiments, the time of the arrival may be determined by extrapolating a rising edge of the burst from the signal strength thereof. For example, a received signal strength indicator (RSSI) noise floor may be sampled to define the threshold, a received signal strength indicator (RSSI) signal indicating the signal strength may be calculated, and a time of the rising edge of the burst may be extrapolated based on a rise time of the RSSI signal relative to the RSSI noise floor.

According to still further embodiments, an optical range finder circuit includes an optical emitter circuit, an optical detector circuit, and a ranging circuit. The optical emitter circuit is configured to output respective ranging signals having different frequencies. The optical detector circuit is configured to receive respective optical signals having the different frequencies responsive to operation of the optical emitter circuit and to generate respective detection signals comprising average voltages representing respective phase differences of the respective optical signals relative to the respective ranging signals. The ranging circuit is configured to calculate a range of a target based on a comparison of the average voltages of the respective detection signals.

In some embodiments, the ranging circuit may be configured to calculate, for the respective detection signals, a plurality of distances based on the average voltages of the respective detection signals, and to identify one of the plurality of distances as the range of the target based on a least common multiple thereof.

In some embodiments, the respective optical signals may be continuously modulated and may have respective phase shifts therebetween.

In some embodiments, the optical emitter circuit may be configured to sequentially switch between the respective frequencies to output the respective ranging signals.

In some embodiments, the optical emitter circuit may be configured to dynamically alter power levels of the respective ranging signals output therefrom.

According to yet further embodiments, a laser range finder for a mobile robot having a forward speed, may include three of the following: a circuit that sends the laser signal to a distant object; a circuit that receives a reflection of the laser signal from the distant object; a circuit that processes the laser signal reflection into an estimated time of flight from the robot to the distant object and back at an update rate; and a circuit that reduces or eliminates inaccurate readings based on a comparison of respective range measurements taken at a succession of different positions in space along an approximate but known locus.

In some embodiments, the update rate may be greater than 8 updates per second, for example, based on a forward speed (30 cm/s)*desired updates (1)/forward interval (3.6 cm).

It is noted that aspects described herein with respect to some embodiments may be incorporated in different embodiments although not specifically described relative thereto. That is, all embodiments and/or features of any embodiments can be combined in any way and/or combination. Moreover, other systems, methods, and/or computer program products according to embodiments will be or become apparent to one with skill in the art upon review of the following drawings and detailed description. It is intended that all such additional systems, methods, and/or computer program products be included within this description, be within the scope of the present disclosure, and be protected by the accompanying claims.

BRIEF DESCRIPTION OF THE DRAWINGS

Aspects of the present disclosure are illustrated by way of example and are not limited by the accompanying figures with like references indicating like elements.

DETAILED DESCRIPTION OF EMBODIMENTS

Figure 1:
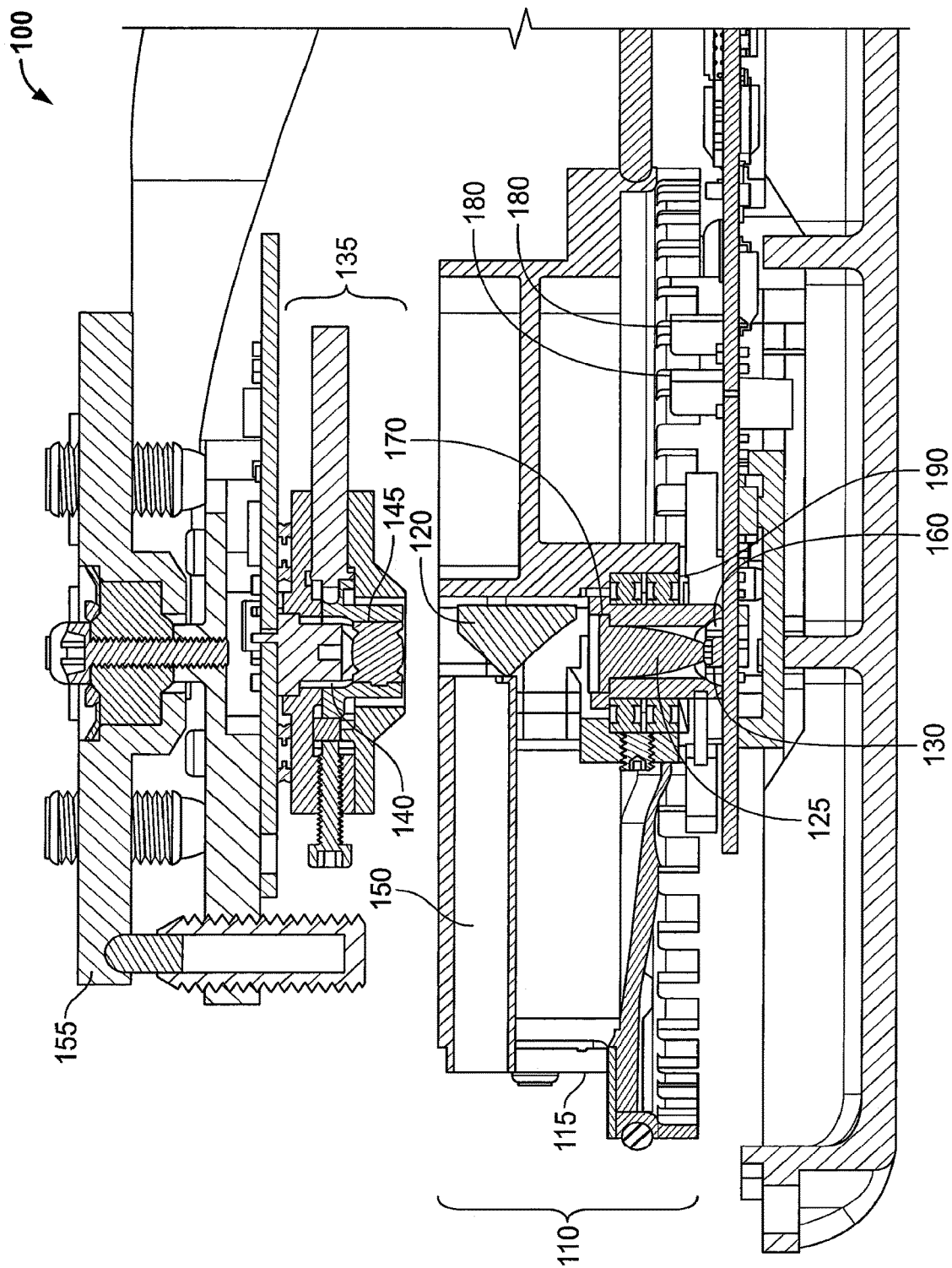
FIG. 1 is an enlarged cross-sectional view illustrating an optical range finder according to some embodiments of the present disclosure.

Autonomous robots that perform functions such as floor cleaning and lawn cutting rely on determining barriers (often user-defined or invisible barriers) for confining their motion. Such robots can use localization systems based on triangulation to determine the robot position within the boundary. In the example of lawnmowers, signals sent between the lawnmower positioned in the property and beacons or environmental features surrounding the lawn allow the lawnmower to estimate the angles and the distance by calculating time of flight and using trigonometry to calculate the robot's current position. Systems and methods related to scanning range finders for use with robotic lawn mowers and other robotic devices are described herein. In some examples described herein, a scanning range finder includes a non-imaging optical element. In some additional embodiments, systems and methods described herein identify and account for wraparound that can cause a distance beyond wraparound to appear as a closer distance. Identifying and accounting for wraparound can be beneficial in applications such as lawn mowing where the laser range finder can receive signals reflected from objects located at a significant distance from the robot.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. As used herein, the term "and/or" includes any and all combinations of one or more of the associated listed items. Like numbers refer to like elements throughout.

It will be understood that although the terms first and second are used herein to describe various signals and/or other elements, these signals and/or elements should not be limited by these terms. These terms are only used to distinguish one signal or element from another signal or element. Thus, a first signal or element discussed below could be termed a second signal or element, and similarly, a second signal or element may be termed a first signal or element without departing from the scope of the present disclosure.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in the Figures is turned over, elements described as being on the "lower" side of other elements would then be oriented on "upper" sides of the other elements. The exemplary term "lower" can therefore encompass both an orientation of "lower" and "upper," depending of the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises," "comprising," "includes," and/or "including," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to cross-sectional illustrations that are schematic illustrations of idealized embodiments of the invention. As such, variations from the shapes of the illustrations are to be expected, for example, due to normal manufacturing tolerances. Thus, the regions illustrated in the figures are schematic in nature and their shapes are not intended to illustrate the precise shape of a region of a device and are not intended to limit the scope of the invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this disclosure and the relevant art and will not be interpreted in an idealized or overly formal sense unless expressly so defined herein.

Some embodiments of the present disclosure may arise from realization that optical systems typically found in scanning range finders are based around imaging optical paths, where the light rays projected from the target to the detector map 1:1 such that, if the detector were replaced with an image sensor, a 'picture' could be taken. However, such imaging optics may be unnecessary in single pixel ranging systems, which instead depend upon total light intensity. In addition, imaging-based optical systems may have inherent limitations regarding the placement tolerance of the optical elements. Also, the locations of the light rays striking the detector may change with a non-bore-sighted optical path, and some degree of offset between transmit and receive optical paths may be necessary with phase detecting range finders (since crosstalk may not be tolerated).

Embodiments of the present disclosure can address the above by providing an optical range finder in a mobile robot that uses a non-imaging or anidolic optical system, instead of imaging-based optical paths. In some embodiments, the anidolic optical system may include a compound parabolic concentrator or collector (CPC) element that directs light rays to an optical detector without defining an image of the source thereon. In range finders including non-imaging optical systems as described herein, tolerance to optical element misalignment may be increased, photons that enter the optical system may be gathered and directed onto the active area of an optical detector at larger angles of incidence, and the send-receive offset (a non-bore-sighted) optical path may be maintained. In general, non-imaging optics are optics designed for the transfer of light radiation between a source and a target which, unlike traditional imaging optics, do not attempt to form an image of the source; instead non-imaging optics provide an optical system for optical radiative transfer from a source to a target.

Figure 2:
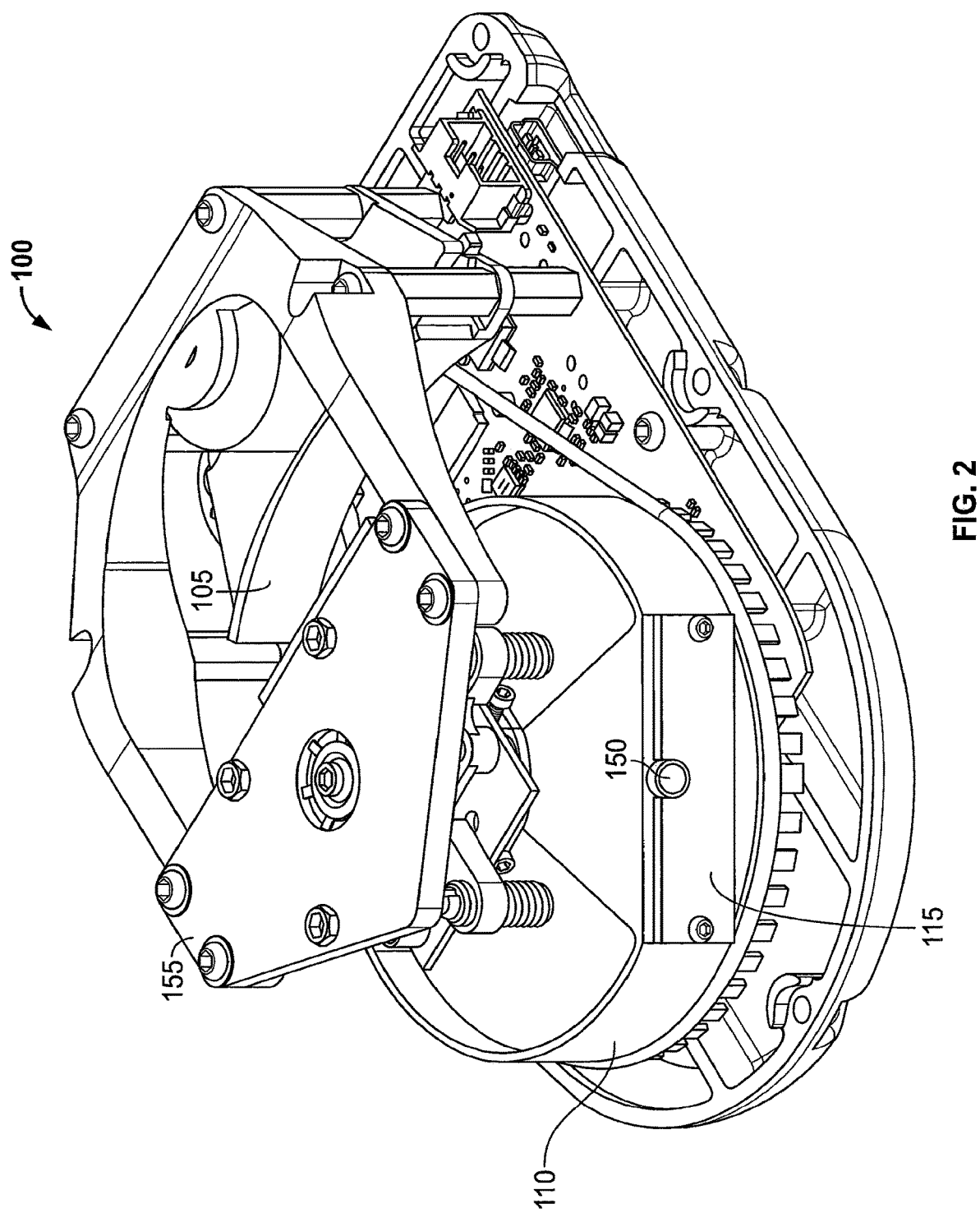
FIG. 2 is a perspective view illustrating an optical range finder according to some embodiments of the present disclosure with its outer cover removed.
Figure 3:
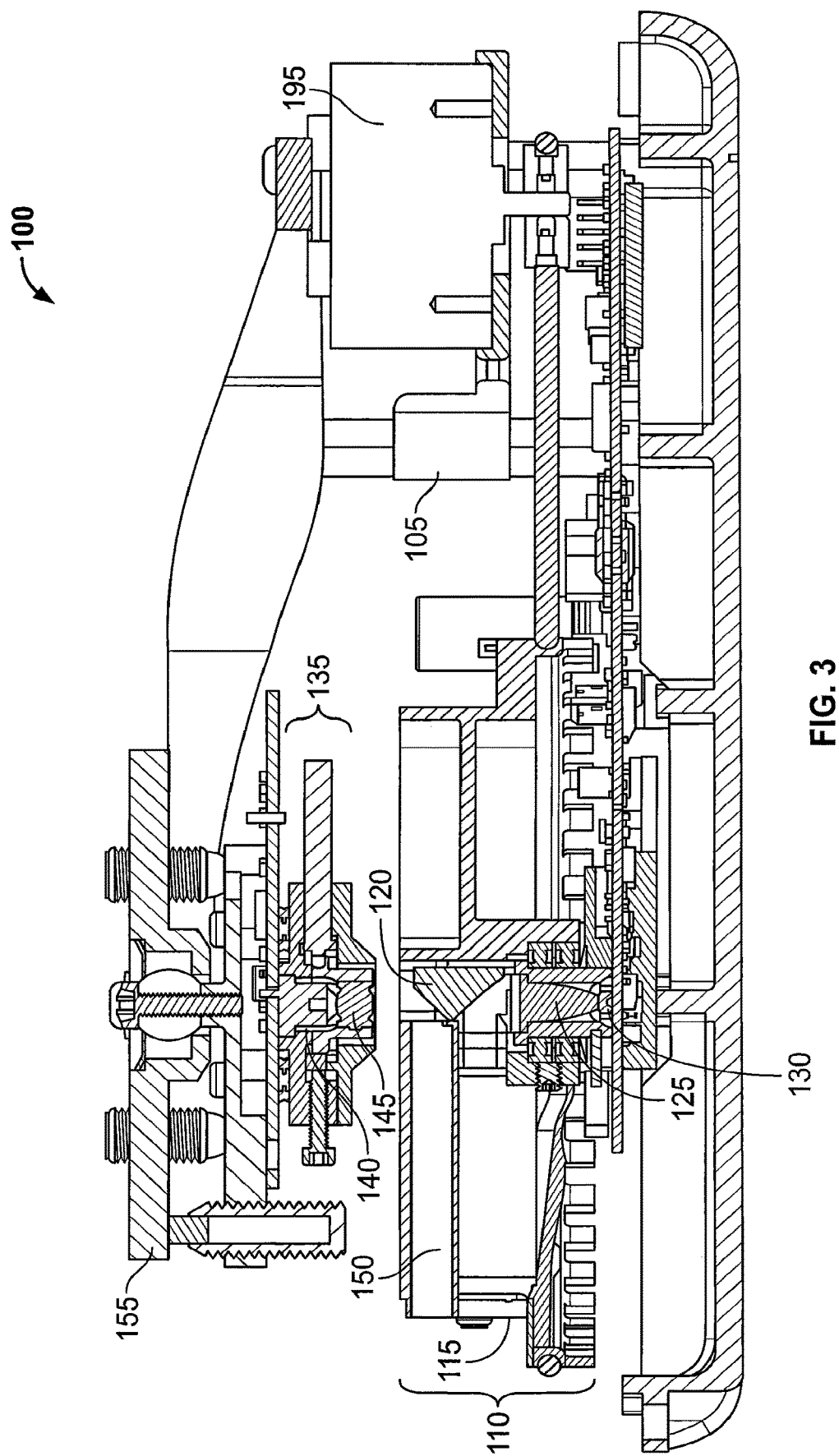
FIG. 3 is a cross-sectional view illustrating an optical range finder according to some embodiments of the present disclosure.

Some embodiments of the present disclosure as illustrated in FIGS. 1-3 are directed to a mobile robot including a scanning laser range finder 100 having a rotatable or spinning turret 110 containing a reflective polygonal surface (illustrated as folding mirrors 120) and collection optics (including Fresnel lens 115). As shown in the central region of the enlarged cross sectional view of FIG. 1, in operation, the turret 110 rotates the collection optics 115 and folding mirrors 120, providing a 360 degree scanning mechanism for collection of incident optical signals. The terms 'return', 'received', and 'reflected' with reference to optical signals described herein are used interchangeably to refer to an optical signal that is a reflection of a ranging signal transmitted from one or more optical emitters described herein.

Figure 10A:
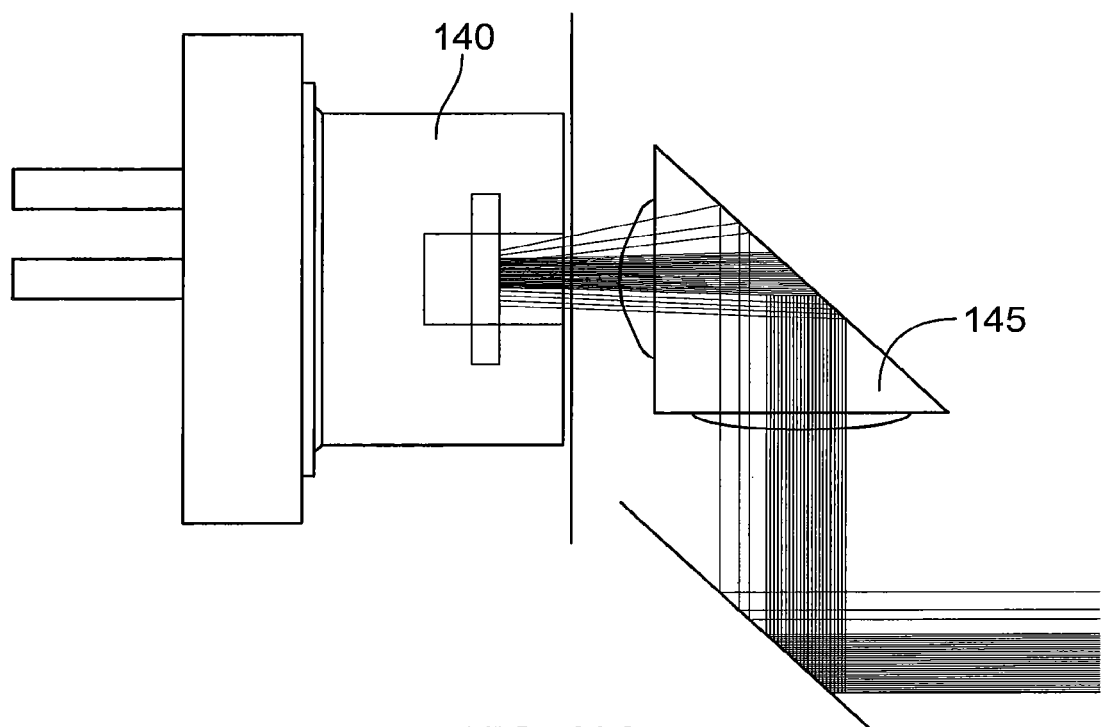
FIGS. 10A-10C and 11A-11C are schematic diagrams illustrating collimating lens assembly configurations for reducing or minimizing the height of the collimation assembly according to some embodiments of the present disclosure.
Figure 10B:
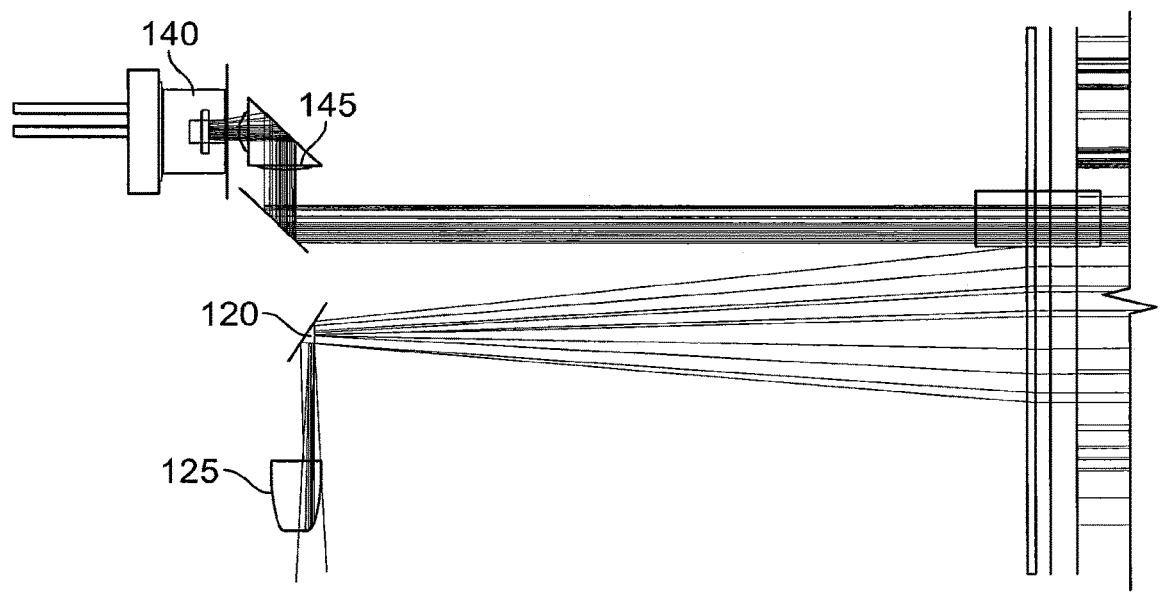
Figure 10C:
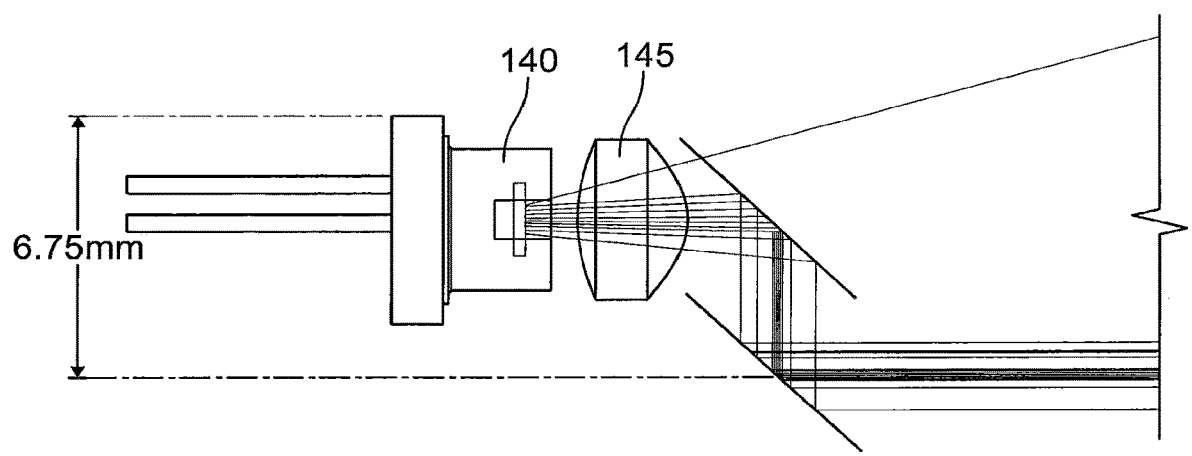
Figure 11A:
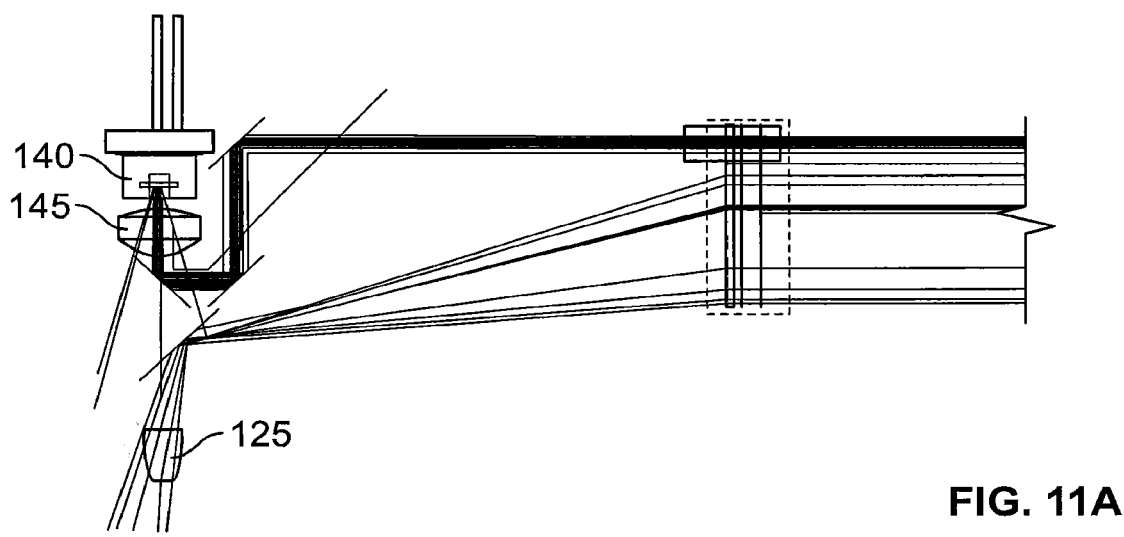
Figure 11B:
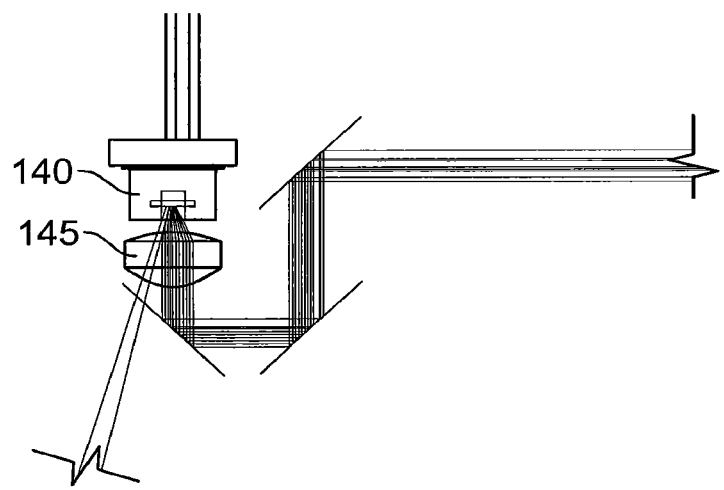
Figure 11C:
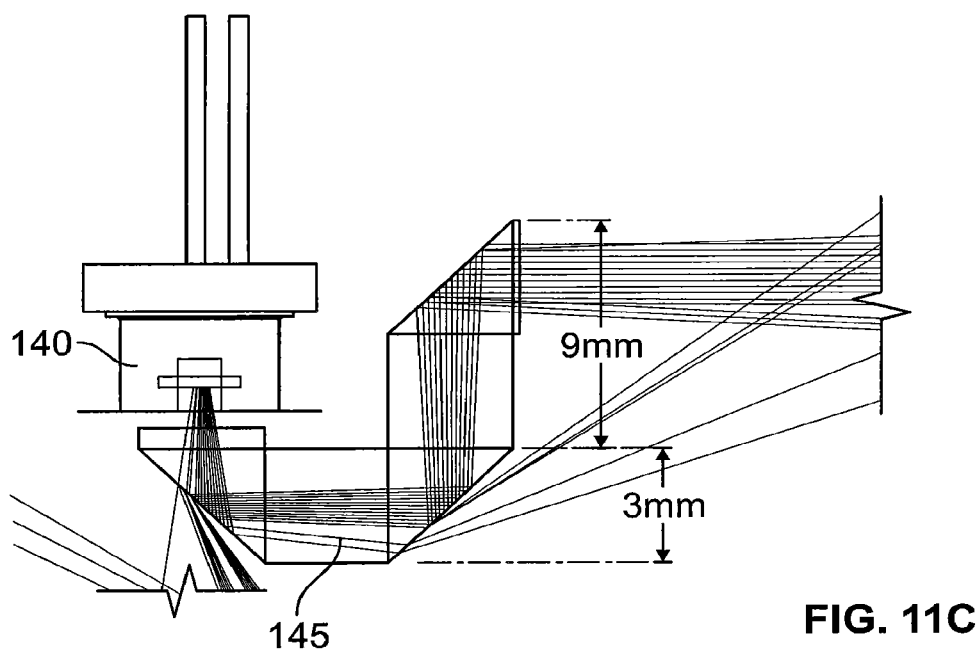

Above the turret 110 is the laser and collimation adjustment assembly 135, which includes at least one optical emitter (illustrated as a laser diode 140) and a collimating lens 145. The laser collimation assembly 135 is coupled to a pitch/roll mount 155. In FIGS. 1-3, the laser collimation assembly 135 is illustrated in a vertical configuration, in which the laser emitted by the laser diode 140 exits via the transmission barrel 150 near the top of the turret 110. In some embodiments, the laser range finder 100 may be configured to reduce or minimize the overall height of the system in order to obtain a low profile for household, e.g., floor cleaning robot applications. A low profile can be useful because, in an 360 degree scanning application, the laser range finder 100 will typically be the topmost element of the structure (to provide unobstructed visibility of up to 360 degrees), but may require a significant portion of the system height (either added to the system height or subtracted from the system internal design volume). As such, FIGS. 10A-10C and FIGS. 11A-11C illustrate alternate configurations of the laser assembly 135 that may be used to reduce overall height. In particular, FIGS. 10A-10C illustrate horizontal configurations of the laser collimation assembly, while FIGS. 11A-11C illustrate alternate vertical configurations of a laser collimation assembly according to embodiments of the present disclosure. The examples shown in FIGS. 10A-10C and FIGS. 11A-11C include folded optical paths, the laser embedded in the turret 110 with a slip ring, and/or a non-collimated light source 140, among other options for reducing or minimizing the height of the collimation assembly 135 and otherwise increasing or maximizing detection of overhanging obstacles.

Figure 13A:
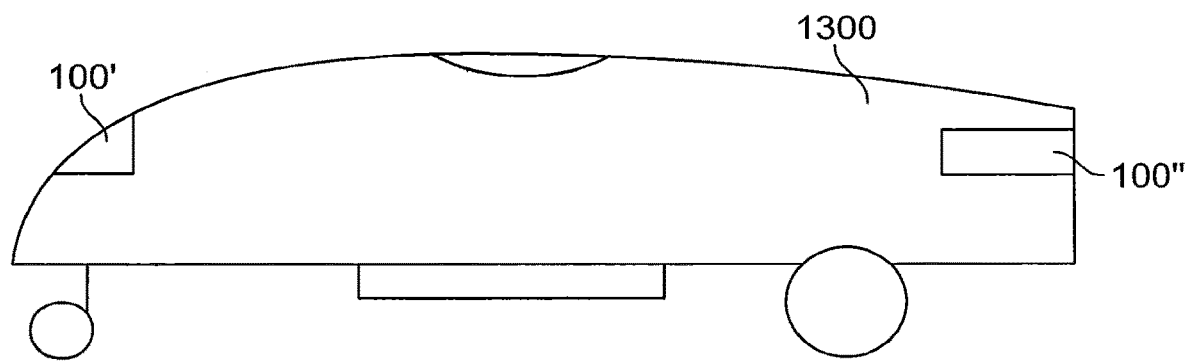
FIGS. 13A and 13B are side and top views, respectively, illustrating various positioning of optical range finders on a mobile robot in accordance with some embodiments of the present disclosure.
Figure 13B:
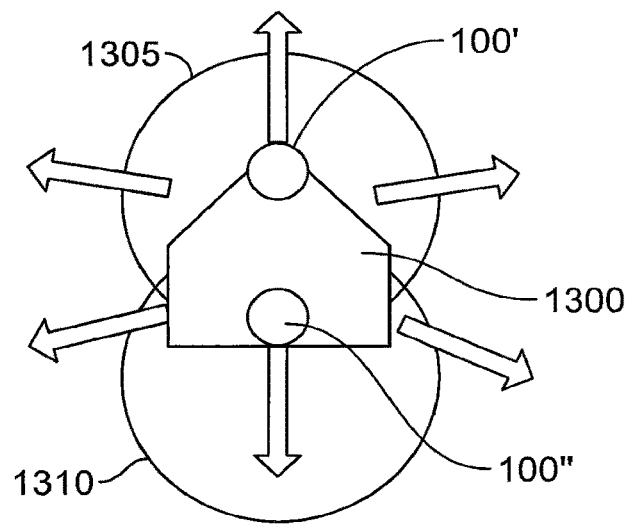

While discussed above with reference to a topmost position, FIGS. 13A-13B illustrate that the scanning laser range finder may be mounted in various and/or multiple positions on a mobile robot 1300. In particular, as other sensors and/or user interface elements may compete for the top center location on the robot 1300, the example of FIGS. 13A-13B illustrates a scanning laser range finder mounted at two positions 100', 100" at opposite ends (e.g., the front and back) of the robot 1300. The rotation of the scanning laser range finder at the two positions 100', 100" may cover respective scanned areas 1305, 1310 around the robot 1300. The scanned areas 1305, 1310 may each cover less than 360 degrees due to limitations on rotation that may be imposed by the respective positions 100', 100", but may overlap such that the combination of the scanned areas 1305, 1310 provides full 360 degree coverage. Other position(s) of the scanning laser range finder may also be possible. More generally, although primarily described herein with reference to a scanning laser range finder 100 mounted at a topmost location on a robot or other structure, it will be understood that scanning laser range finders in accordance with embodiments of the present disclosure are not limited to any particular location, and may even be located at multiple locations on a robot or other structure.

In some examples, the mobile robot 1300 is an autonomous robot lawnmower is configured to mow a lawn. The autonomous robot lawnmower moves about the lawn and cuts grass as it is traversing the lawn. The robot lawnmower includes a robot body, a surface treater secured to the robot body, a sensor system having at least one surface sensor carried by the robot body and responsive to at least one surface characteristic, and a drive system including at least one motorized wheel. The drive system is carried by the robot body and configured to maneuver the robot lawnmower across lawn. In this example, the surface treater is a reciprocating symmetrical cutter. The robot body also supports a power source (e.g., a battery) for powering any electrical components of the robot lawnmower, including the drive system, the surface treater, and a navigation system. When not mowing the lawn, the robot lawnmower may be docked at a base station or dock. In some examples, the dock includes a charging system for charging the battery housed by the robot body 100. Further details about the design and operation of the robotic lawn mower can be found, for example, in U.S. patent application Ser. No. 14/512,013 filed on Oct. 10, 2014 and titled "Autonomous Robot Localization," the contents of which are hereby incorporated by reference.

For mowing operations the robot lawnmower is placed on the lawn so that it can mow the lawn which is bounded by perimeter. The robot lawnmower is constrained to not travel outside of the perimeter. To demark the perimeter, one or more boundary markers can be placed in or around the lawn and/or environments features such as trees and man-made structures can be used to identify locations surrounding the lawn. The boundary markers and/or environmental features reflect a signal generated by the laser included in the robot lawn mower. A controller in the robot uses trigonometry to estimate the position of the robot based on the signals received and collected by the CPC in the robot. In general, the pose or position of the robot lawnmower can be determined based on the signals reflected by the boundary markers and environmental features. More particularly, the robot lawnmower sends a signal (e.g., a laser signal) that is reflected by one of the boundary markers or environmental features. The robot lawnmower can determine the angle between the robot lawnmower relative to the boundary marker or environmental feature based on the location at which the signal is received. Additionally, the robot lawnmower can determine the distance between the robot lawnmower and the boundary marker or environmental feature based on the time-of-flight between the sending of the signal and the receipt of the reflected signal. Thus, based on the information, the robot lawnmower's pose can be determined by trilaterating based on received time-of-flight information (range/heading) from each of the boundary markers or environmental features. In general, trilateration is the process of determining absolute or relative locations of points by measurement of distances, using the geometry of circles, spheres or triangles. In one example, trilaterating can be based on a least squares algorithm using the distance/time-of-flight measurements.

Figure 12A:
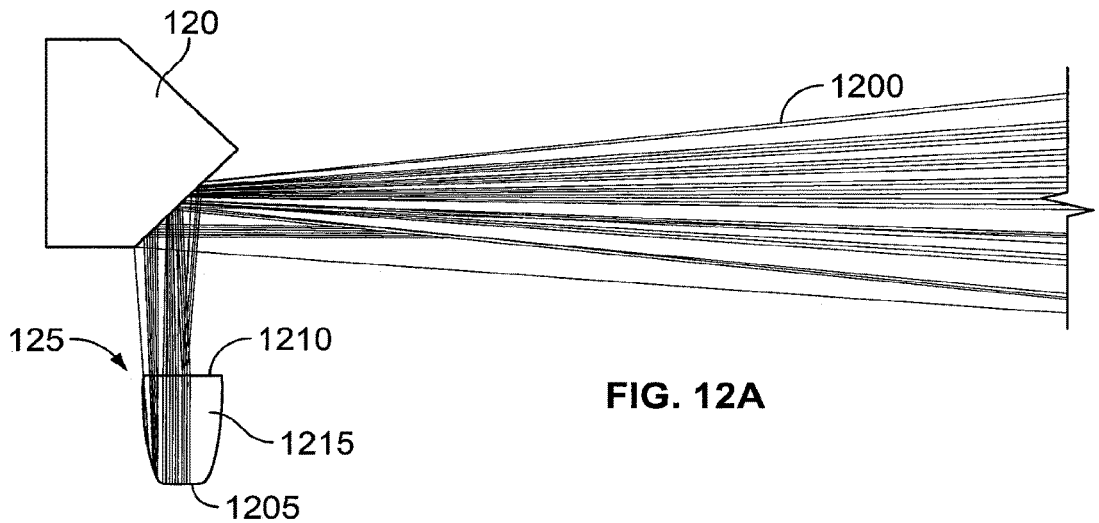
FIGS. 12A-12D are schematic diagrams illustrating compound parabolic concentrator (CPC) elements according to some embodiments of the present disclosure.
Figure 12B:
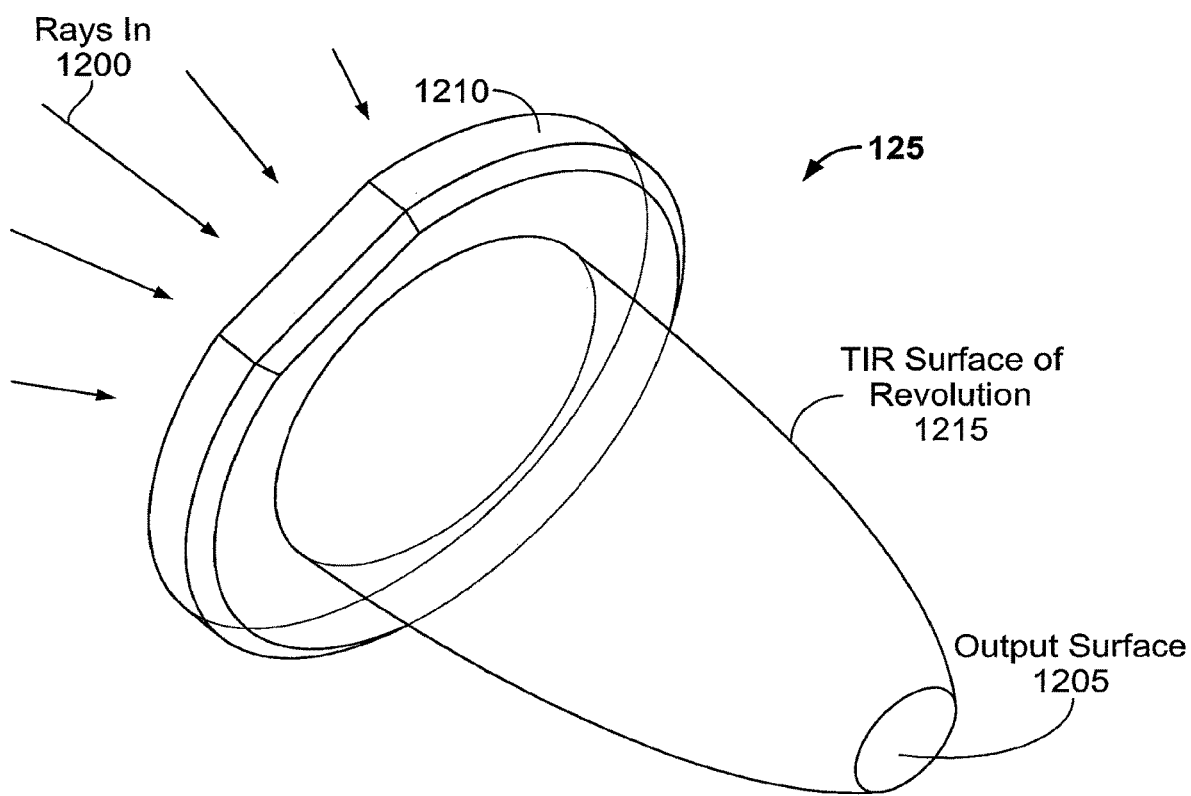

Referring again to FIGS. 1-3, below the mirror block 120 in the turret 110 is a non-imaging or anidolic optical element, (illustrated as a compound parabolic concentrator (CPC) element 125), which directs photons to at least one optical detector (illustrated as a photodiode 130). The CPC element 125 is a non-imaging element arranged within the turret 110 to receive light from the mirrors 120 during rotation of the turret. The CPC element 125 collects and directs the incident light onto the photodiode 130 without forming an image of the source thereon, and is illustrated in greater detail in FIGS. 12A-12D. As shown in FIG. 12A (in side view) and FIG. 12B (in perspective view), the CPC element 125 is arranged to receive incident light 1200 directed thereto by the mirror block 120. The incident light 1200, which includes reflected optical signals transmitted by the laser diode 140, is received at the input or entrance aperture adjacent a flange 1210 and is directed via reflection (which may be surface or total internal reflection by the parabolic surfaces 1215) to the output aperture or surface 1205, which provides the light 1200 to the photodiode 130. The CPC element 125 allows for increased tolerance of optical misalignment, and can collect light at larger angles of incidence than some conventional parabolic concentrator elements.

Figures 12C, 12D:
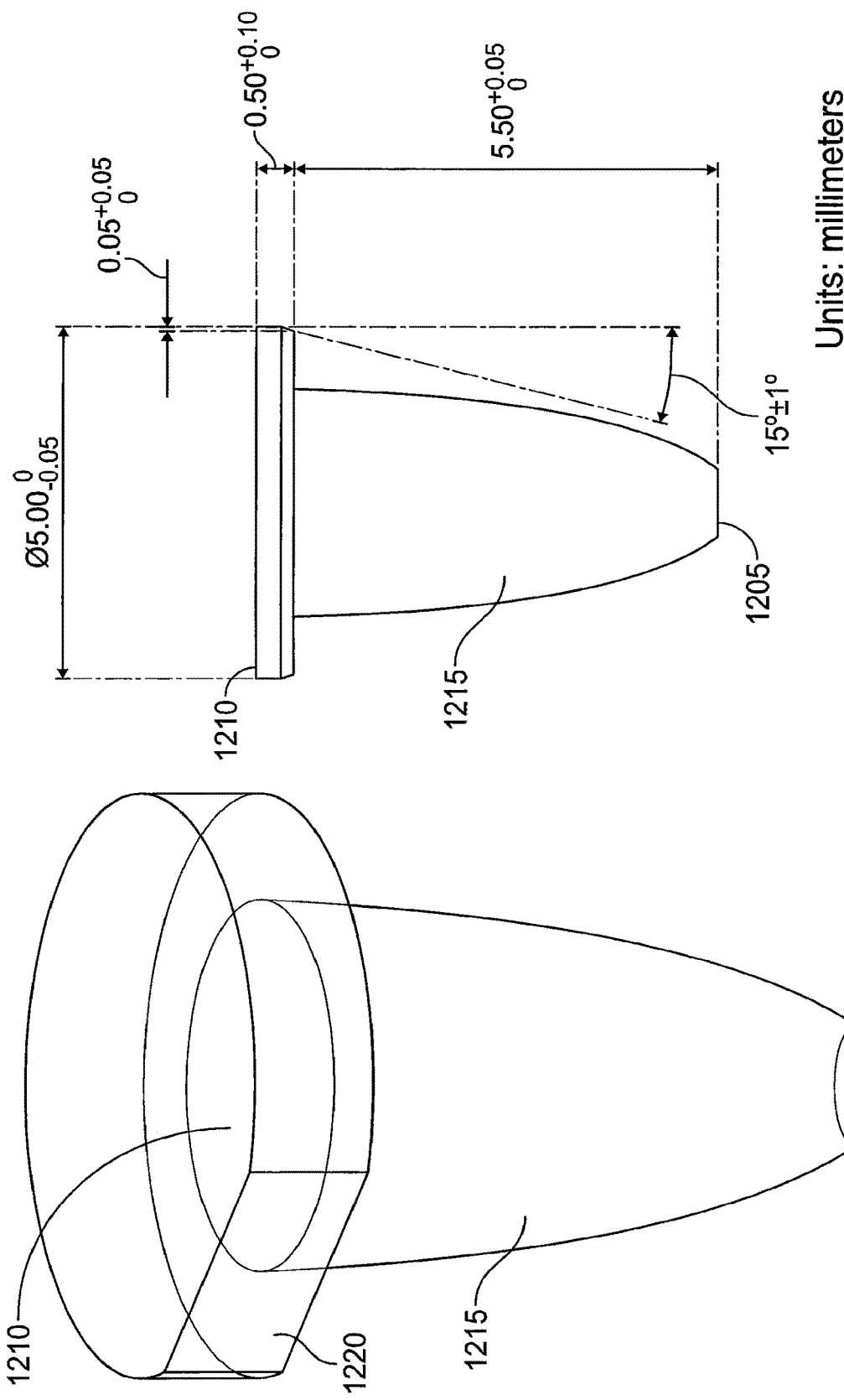

FIGS. 12C and 12D illustrate an alternate perspective view and a side view with example dimensions of the CPC element 125, respectively. As shown in FIGS. 12C and 12D, the flange 1210 is sized and configured to facilitate manufacture of the CPC element 125 and/or handling of the CPC element 125 during assembly of the range finder 100. The CPC element 125 is formed of an injection molded plastic which provides the benefit of allowing the CPC element 125 to be manufactured using an injection molding process. The CPC element 125 includes two portions—the parabolic surface 1215 and the flange 1210 which are formed as a unitary piece of injection molded plastic. The top and bottom surfaces of the CPC element (e.g., the top surface of the flange 1210 and the bottom surface of the parabolic surface 1215) are both substantially planar. The flange 1210 defines a lip or ring protruding from an edge of the parabolic surface 1215 and having a diameter greater than that of an adjacent opening defined by the entrance aperture of the parabolic element. The flange 1210 is generally cylindrical in shape with one a planar surface 1220 corresponding to an area in which plastic is injected into a mold cavity in fabrication of the CPC element 125. Thus, inclusion of the flange 1210 allows the CPC element to more easily be fabricated using an injection molding process because the molding gate which produces a flat surface can be positioned on a portion of the CPC element 125 that is not required to be rotationally symmetric (e.g., it is not part of the parabolic surface 1215 designed to be rotationally symmetric to provide a total internal reflection surface).

The greater diameter of the flange 1210 relative to the entrance aperture may allow for ease in removal from the fabrication mold, as well as for ease of assembly into the range finder (for example, using pick-and-place methods). For instance, as shown in FIG. 12D, the flange 1210 may have an outer diameter of about 5.00 mm and a height of about 0.50 mm. In other embodiments, the flange 1210 may have an outer diameter of between about 3 mm and about 7 mm and a height of between about 0.25 mm and about 0.75 mm. In some embodiments, a portion of the flange 1210 adjacent the entrance aperture of the parabolic surface 1215 may be tapered by about 0.05 mm relative to the 5.00 mm diameter thereof. The parabolic surface 1215 may have a height and/or curvature which defines a desired diameter of the output aperture 1205, and or which defines a desired angle or slope relative to the outer diameter of the flange 1210. For instance, in the example of FIG. 12D, the parabolic surface 1215 has a height of about 5.50 mm, which defines an angle of about 15 degrees relative to the edge of the flange 1210. In some additional embodiments, the parabolic surface 1215 can have a height of between about 4 mm and about 8 mm and have an angle of between about 10-20 degrees relative to the edge of the flange 1210. The height and angle are coordinated to provide a total internal reflection surface. However, although illustrated in FIG. 12D with reference to specific dimensions by way of example, it will be understood that CPC elements as described herein are not limited to such dimensions. In some examples, a ratio of the diameter of the top surface of the parabolic surface 1215 (e.g., where the parabolic surface 1215 joins the flange 1210) to the bottom surface of the parabolic surface 1215 (e.g., output surface 1205) can be between about 3:1 and about 4:1 (e.g. about 3:1, about 3.5:1, about 4:1). In some examples, a ratio of the diameter of the top surface of the flange 1210 (e.g., input surface 1210) to the bottom surface of the parabolic surface 1215 (e.g., output surface 1205) can be between about 4:1 and about 6:1 (e.g. about 4:1, about 5:1, about 6:1).

In some embodiments, an indoor mobile robot moving at about 30 cm/s and having a platform diameter of about 36 cm may translate less than about 1/10th of its diameter between scans. For a translation of scans of about 2-5 cm (e.g., 3.6 cm), a desired update rate for the optical detector 130 may be about 5-15 Hz, e.g., 8 Hz. Thus, the scan rate may be about 2-20 Hz, e.g., 5-10 Hz for a floor care robot. If one range is desired for each degree of arc length, the sample rate at 10 Hz would be 3.6 kHz (i.e., 360 samples per rotation of the rotating scanning range finder 100). In the embodiments of FIGS. 1-3, the CPC element 125 and photodiode 130 are fixed or stationary elements within the turret 110, while the mirror block 120 and collection optics 115 rotate with the turret 110 to scan an environment. However, it will be understood that the present disclosure is not limited to such a configuration, and in other embodiments the CPC element and/or the photodiode 130 may be rotatable.

FIG. 2 is a perspective view illustrating the laser range finder 100 with its outer cover removed. FIG. 3 is a cross-sectional view of the entirety of the laser range finder 100. The cross-sectional view of FIG. 3 further illustrates the motor 195 on the right, which spins the turret 110, and an internal calibration wall 105 that is curved with a same radius as the turret 110. The calibration wall 105 thus provides a reference point that is equidistant at all points during a scan. The electronics operating the motor 195 may further include a redundant encoder; if the rotational speed of the turret 110 drops to threshold levels, the laser diode 140 may be shut off to limit eye exposure.

As illustrated in FIGS. 1-3, in some embodiments, the laser range finder 100 may have a turret height of 8 mm, and a system height of 32 mm. The laser range finder 100 may be operational in both dark (e.g., 0 lux) and bright (e.g., sunny outdoor) light environments. In some embodiments, the laser range finder 100 may have a 3.6 kHz sample rate with a 1 degree angular heading resolution and 10 Hz scan rate. The embodiments depicted in FIGS. 1-3 may have a depth of field measurement range of about 2 cm to 4 m, with an accuracy at 4 m of about ±3 cm (which may vary at different distances depending on the color and/or reflectivity of the target). Some embodiments may not include slip rings, and only the optics 115 may spin. In particular embodiments, the laser range finder 100 can detect white-colored targets at 4 m within about ±3 cm specification; at 5 m, this may increase to about ±7 cm. A grey-colored target at the 3 m distance may have an error band of about ±7 cm. The ±3 cm specification can be maintained at 2.5 m. Black-colored targets may not be seen well at 4 m (error band is about ±45 cm). At 1 m, the error band for black target may be about ±4 cm. Some embodiments may use phase shift measurements, as described in detail below, and may have a scan angle of about 286 degrees or more (about 226° or more with cover).

FIGS. 7-10 are plots illustrating output data sets from an optical range finder according to some embodiments of the present disclosure in various operational environments. In the data sets illustrated in FIGS. 7-10, the plots may illustrate all collected data, including noisy data points; however, it will be understood that data points which do not have sufficient signal strength and/or are otherwise deemed not trustworthy may be deleted in further embodiments of the present disclosure. Also, in FIGS. 7-10, samples/scans are taken over a 0.5 degree arc length, such that a scan packet of 360 degrees includes 720 samples. As such, if the laser beam 'jumps' between objects at different distances while one sample is being taken over this arc length, the reported distance may be an average of the two distances. While this may be a source of error for some samples, it will be understood that a statistical model may be built into an occupancy grid recording. Thus, in a robot mapping application according to embodiments of the present disclosure, 'split samples' over two distances may not significantly affect robot mapping and localization.

Figure 7:
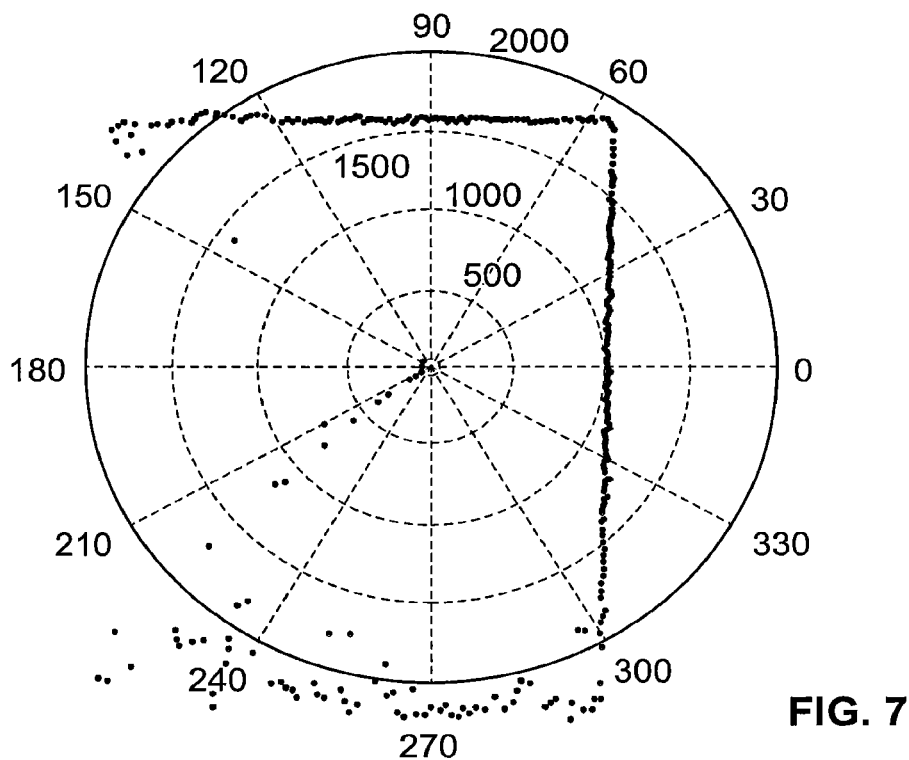
FIG. 7 is a plot illustrating an output of an optical range finder according to some embodiments of the present disclosure after scanning a corner of a room.

In particular, FIG. 7 illustrates the output of the laser range finder 100 after scanning the corner of a room. The corner and walls of the room are indicated by the majority of samples on the plot.

Figure 8:
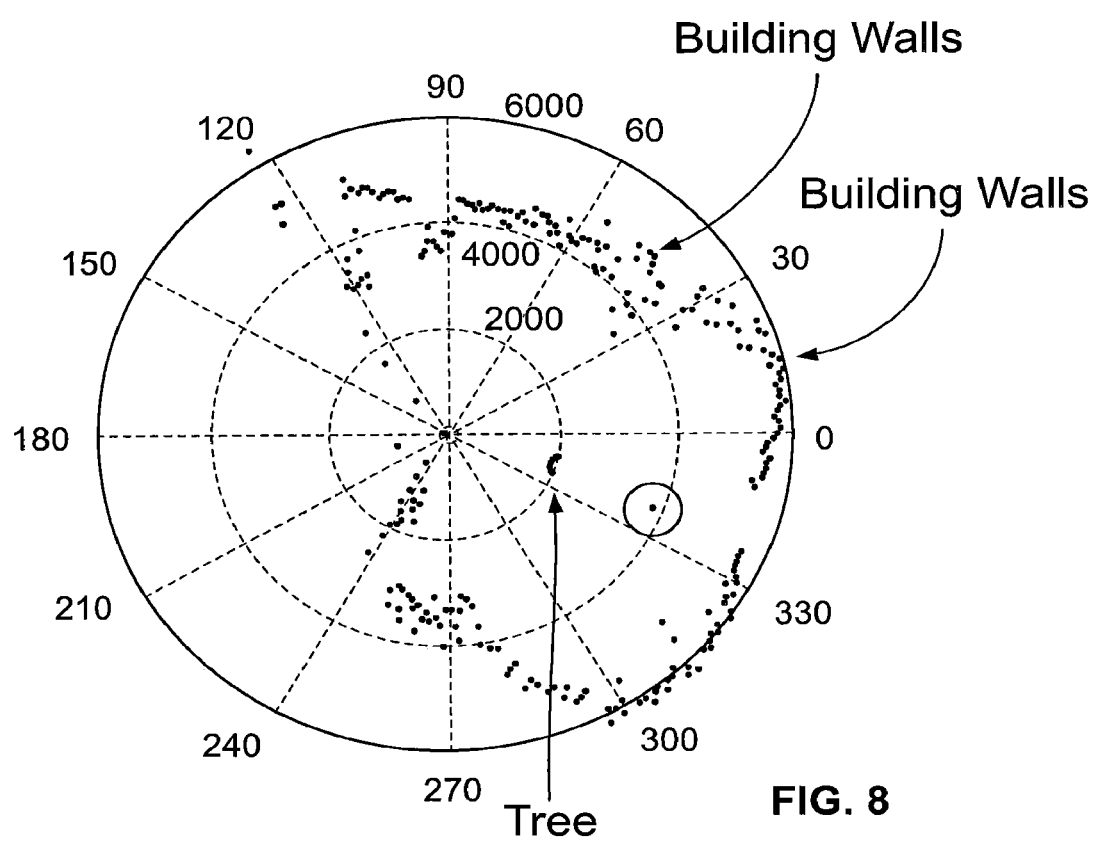
FIG. 8 is a plot illustrating an output of an optical range finder according to some embodiments of the present disclosure for an outdoor space having a tree near a building wall.

FIG. 8 illustrates the laser range finder output for an outdoor space having a tree near a building wall. The samples of FIG. 8 illustrate the case where the laser beam intermittently falls on two different surfaces, where the circled resulting range reading is an average of the readings from the two surfaces. However, the circled output data represents one point in time; thus, when the laser range finder is mounted to a mobile robot, the circled average data point may fall out of subsequent readings as the robot travels, and the circled data can be identified as noise that can be ignored.

Figure 9:
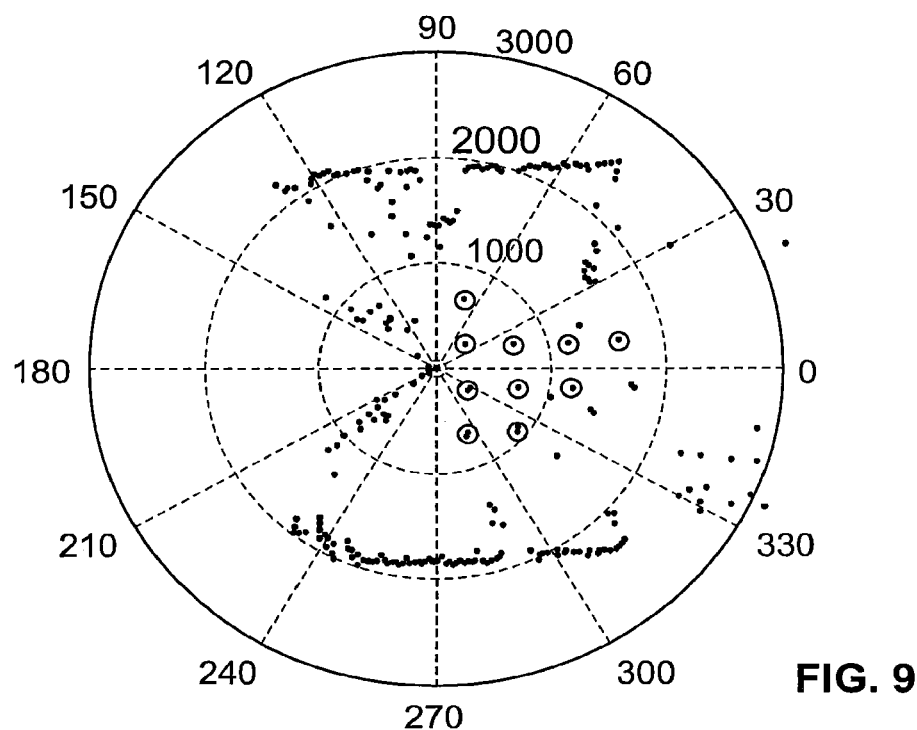
FIG. 9 is a plot illustrating an output of an optical range finder according to some embodiments of the present disclosure for a space having chair legs therein.

FIG. 9 illustrates the laser range finder output for a space having chair legs. The samples of FIG. 9 likewise illustrate the case where the laser beam intermittently falls on two different surfaces, where the points circled indicate the chair legs. FIG. 9 thus illustrates that the importance of fairly fine angular resolution for accurate navigation through 'clutter' or other small objects. Such fine angular resolution may be provided by embodiments of the present disclosure by using phase shift measurements, as described in greater detail below.

Pulse-based time of flight (ToF) measurements and phase shift measurements involve several differences. For example, the peak and average laser powers are typically much lower in phase shift measurements, as the measurement is made in a different manner. In particular, a phase shift-based system's laser is continuously modulated, and typically only the transmitted frequency (or frequencies) is observed in the measurement. In this respect, a phase shift-based system relies on frequency domain measurements rather than time domain. In some embodiments of the present disclosure, the scanning laser range finder 100 may use a clock gate to perform time of flight measurements to provide a coarse target range, and may perform phase shift measurements to provide a fine resolution range. That is, the laser range finder 100 in accordance with embodiments of the present disclosure may rely on both time of flight and phase shift in measurements.

Further embodiments of the present disclosure may arise from realization that, while phase shift-based range detection may be inherently more sensitive than pulse time of flight, due for example, to the noise immunity of the detection system afforded by the use of a bandpass filter and the averaging nature of the measurement acquisition, phase shift measurement typically employs a continuously modulated transmitter and an averaging detector, rather than direct ToF and a single (or small number of) pulses. However, with a continuously modulated transmit signal, the phase shift of the return signal 'wraps around'. This can occur every 90 degrees with a multiplying or XOR type phase detector (180 degrees round trip). The phase shift method thus introduces ambiguity regarding the measured distance, because, with increasing distance, the phase may vary periodically. As such, for phase-shift based detector systems, the phase shift for a long distance can cause aliasing to a shorter distance. Further embodiments of the present disclosure, which may address this ambiguity, are described below with reference to FIGS. 4, 5A-5D, and 6A-6B.

Figure 4:
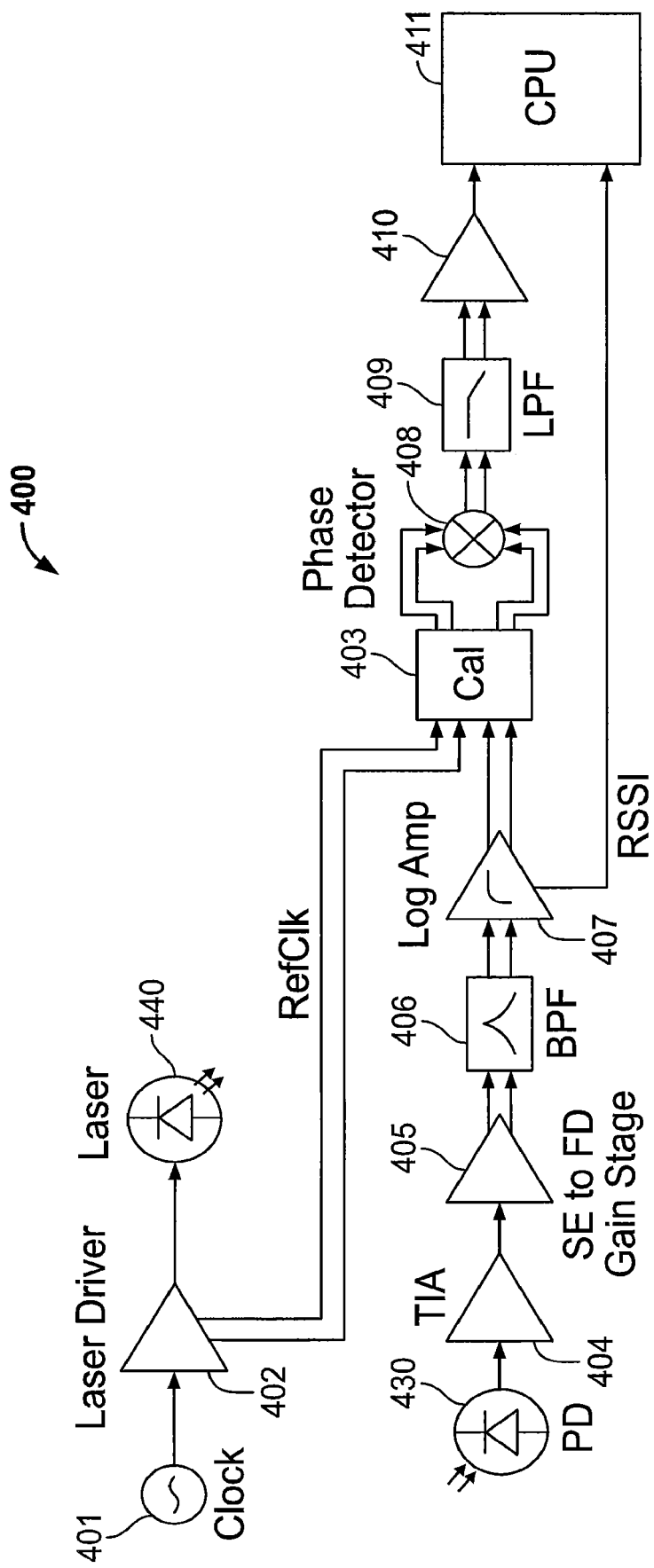
FIG. 4 is an electrical block diagram illustrating an optical range finder circuit according to some embodiments of the present disclosure.
Figures 6A, 6B:
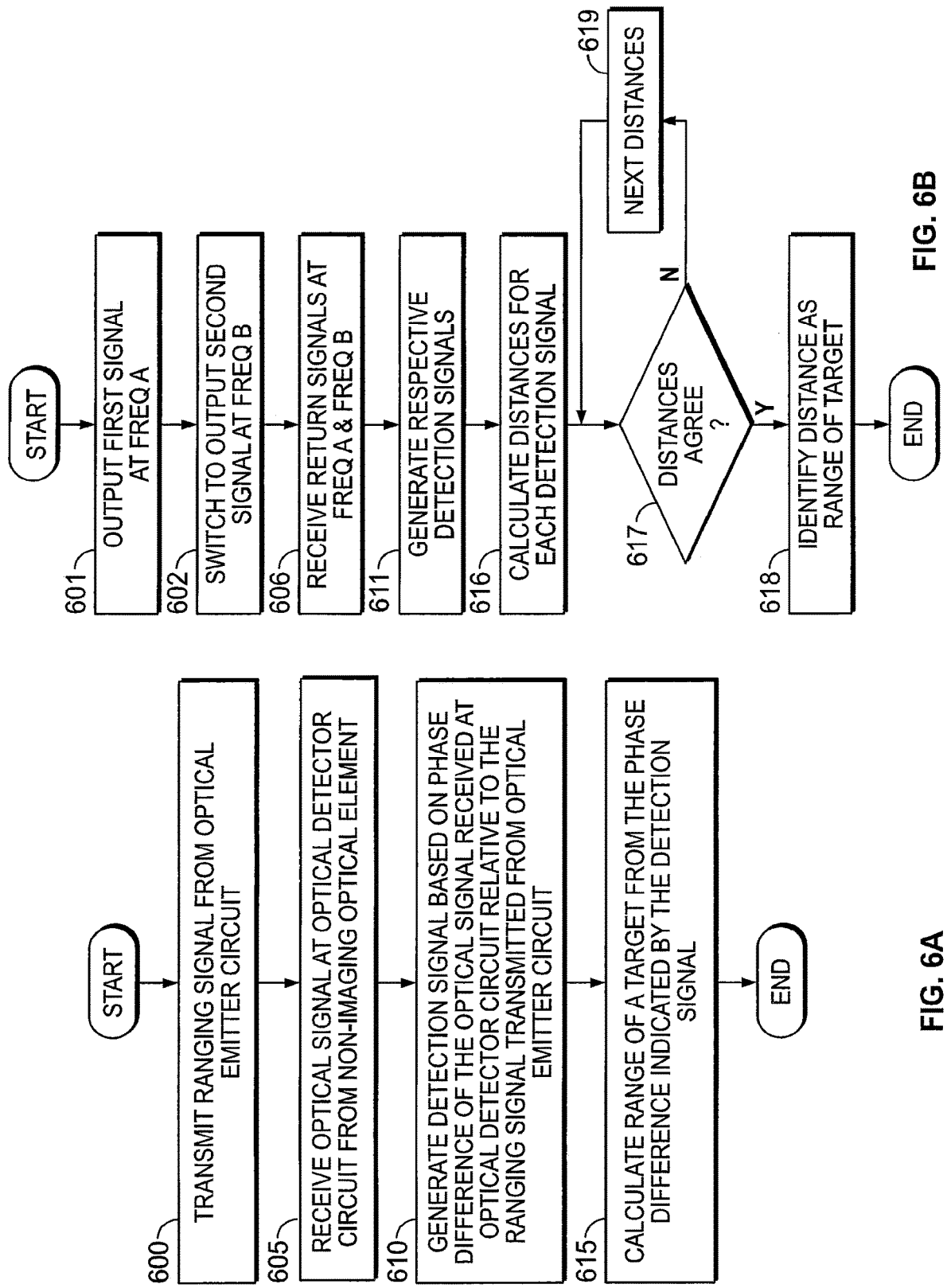
FIGS. 6A-6B are flowcharts illustrating operations for addressing phase wraparound in a detection signal according to some embodiments of the present disclosure.

FIG. 4 is an electrical block diagram of a range finder circuit 400 according to embodiments of the present disclosure, and FIG. 6A is a flowchart illustrating operation of a range finder circuit according to embodiments of the present disclosure. As shown in FIG. 4 with reference to FIG. 6A, a programmable clock source 401 feeds an optical emitter circuit including a driver 402 and at least one optical emitter (illustrated as laser diode 440). The driver 402 drives the diode 440 to transmit an optical signal (also referred to herein as a ranging signal) (Block 600) and sends a reference signal RefClk to the calibration block 403. The optical signal, which is received from a target, is collected (for example, by the collection optics 115 of FIGS. 1-3) and directed (for example, by the mirror block 120 and CPC 125 of FIGS. 1-3) to an optical detector circuit (Block 605). The optical detector circuit includes at least one optical detector (illustrated as photodiode 430) and elements 403-410 shown in FIG. 4. In operation of the optical detector circuit, the electrical signal output from the photodiode 430 is converted into a voltage by transimpedance amp (TIA) 404. The output of the TIA 404 may be differential, or if single-ended the signal from the TIA 404 may be amplified by a single-ended to differential converting amplifier 405, filtered by a bandpass filter 406, delivered to a log amplifier 407 for dynamic range compression and signal strength measurement, and transmitted to a phase detector or comparator 408. The calibration block 403 also transmits a known signal to the phase detector 408 for compensation due to thermal drift. Based on the phase difference between the two input signals, the phase detector 408 generates an output signal (also referred to herein as a detection signal) (Block 610) indicating an average voltage to a low pass filter 409, which is output to buffer 410 for delivery to a host/CPU 411. The host/CPU 411 also receives a return signal strength indicator signal RSSI from the log amp 407. The host/CPU 411 controls the calibration routines, captures and converts the analog signals to digital data, and culls samples with insufficient signal strength. The host/CPU 411 (also referred to herein as a ranging circuit) calculates the range or distance to the target (Block 615), which may be proportional to the low pass filtered output voltage of the phase detector 408.

Particular embodiments of the present disclosure combine the elements described above to implement a non-imaging scanning range finder including a real-time calibration system, a high noise immunity 2-Pi phase detector, a photon gathering system, a hybrid phase discriminating/Time-of-Flight ranging system, dynamic range enhancement, a source-synchronous bandpass filter, and compensation for Amplitude Dependent Timing Errors (ADTEs), as described in detail below.

A real-time calibration system for use in scanning optical range finders in accordance with some embodiments of the present disclosure may use a mixed signal scale compensation scheme, in which analog voltage levels of logic outputs are used to determine range data beginning and ending points (voltages for min/max range). By muting the logic inputs appropriately, the output voltage levels can be detected and slope and offset can be factored into the compensation scheme. This may be accomplished by forcing the input signals to the phase detector to a known or predetermined state. In the present embodiment, symmetry in the output stage of differential (e.g. LVPECL) logic gates may be taken advantage of, and swings of both polarities can effectively be inferred from one logic state.

The calibration system may further utilize dynamic clock & filter frequency synchronization, by providing a high Q bandpass filter in the receiver signal path to reduce or minimize noise bandwidth and improve signal to noise ratio. This filter can be realized with passive components, and can have significant variation from the ideal frequency. In order to transfer maximum signal, the reference clock signal frequency should match the frequency of this bandpass filter. To determine this frequency, a compensation scheme may be employed whereby the signal strength is measured while the laser strikes a calibration target (for example, the internal calibration wall 105 shown in FIGS. 2-3). After this measurement is made, the reference clock frequency may be varied up and down from the nominal frequency, and the new nominal frequency may be set to the frequency which yields the highest signal strength. This process can be repeated periodically to ensure that the transmit frequency matches the bandpass filter frequency, regardless of temperature or other component property variation.

In performing calibration, it is understood that certain component parameters within the system may have an initial tolerance, and may also drift over time (mostly due to temperature, but also due to long-term aging). In order to address these effects and maintain proper ranging capability, calibration may be performed both as a one-time-programmable (OTP) factory step, and as a continuous on-the-fly (OTF) procedure. In particular embodiments of the present disclosure, OTF calibration occurs once per scan (currently 10 Hz) and includes the following operations:

1. Noise Floor Measurement—The laser diode (element 440 shown in FIG. 4) is turned off and the Return Signal Strength Indicator (RSSI) is sampled 64 times and averaged to set a baseline for the current noise floor of the system. This noise floor can be used during scanning as a metric to determine if the measurement is valid (for example, a measurement should be at least 10% above the noise floor to count as a valid measurement), as well as to infer the level of ambient light that is present.

2. Mute Calibration—During this period, the entire signal chain up to the phase detector (element 408 shown in FIG. 4) is electrically disconnected from the phase detector using analog switches. Circuits internal to the phase detector pull the inputs to a known state which causes the output to swing to a maximum value. The output thereby simulates a 180 degree out-of-phase signal condition. Due to the symmetry of a fully differential signal path, a totally in phase (0 degree shift) condition can be inferred. This signal is sampled multiple times, and the average is stored for the subsequent measurements. This data can be useful in that the true full swing of a logic can deviate slightly from nominal. As the full range of this output may directly correspond to the full distance or range of measurement for the range finder (before wraparound), the output swing range should be known precisely to correlate to distance. For example, at 8 MHz modulation, the wraparound distance with an XOR type phase detector is 9525 mm. The nominal output swing of an LVPECL XOR gate is 1.6V, giving a nominal conversion factor of 9525/1.6=5953 mm/V. However, if initial tolerance and temperature effects push this output swing to 1.7V, for example, then the conversion factor would become 9525/1.7=5603 mm/V, resulting in a 350 mm error in every measurement.

3. Offset Calibration—Due to phase shift and propagation delay inherent to the electrical circuitry in the return signal path, even if a target could theoretically be measured at 0 mm (i.e. point blank measurement), the returned signal would not come back in-phase but would have some nominal phase shift. Though the nominal value can be calculated, it may be largely unknown due to component tolerance and temperature shift. Therefore, embodiments of the present disclosure can measure a known, fixed distance to determine the phase shift, using the calibration wall 105 within the range finder 100 (shown in FIGS. 2-3). The calibration wall 105 is curved with the same radius as the turret 110, and is therefore equidistant at all points during measurement. The calibration wall 105 is ranged in the same manner as any other point in the real world, except that the resulting data is stored as a constant offset for the next scan (after which it may be calculated again).

In contrast, OTP calibration may be a factory-specific calibration operation, which is performed once to store parameters in a memory (such as a flash memory module) of the range finder 100, which is to be read upon device start up. The stored parameters are used in matching the electrical bandpass filter (BPF) center frequency. The BPF includes passive components (inductors and capacitors), and so the initial tolerances may cause the center frequency to vary from the nominal. If a high Q filter is used and the laser is modulated at a frequency other than the true center frequency, the signal-to-noise ratio (SNR) may suffer and system performance may be degraded. While components may be hand selected and tuned to match the desired center frequency, this method is labor intensive and would not be feasible for manufacturing in large quantities.

In some embodiments, the BPF center frequency may be determined using a programmable frequency clock, which includes a fractional-N phase locked loop (PLL) that can be varied by a host over a serial connection (I2C or SPI). In this method, the range finder 100 may be implemented with a special mode in which the turret 110 is not spinning, but is pointed at a fixed distance target, such as the internal calibration wall 105. The clock can be swept through a range of frequencies and the RSSI for each measurement can be used to determine which frequency is the actual center frequency of the BPF.

If the PLL response is fast enough (i.e., frequency change and lock is fast enough), then this can also be included as an operation in the OTF calibration, for example, to account for BPF temperature drift. This may require a slight modification to speed up the result, that is, instead of sweeping a broad range of frequencies, the calibration routine may take one sample (against the calibration wall 105) at the currently nominal frequency, and one sample each at a frequency above and a frequency below that nominal. The frequency can thus be set accordingly based on which of these three measurements indicates the highest RSSI.

In performing calibration, a highly accurate (but somewhat slow) 16-bit Sigma-Delta ADC may be used to sample the final stage of the signal chain and provide the range measurement. However, due to the noise in the system, the lower bits of this measurement may not be useful and may introduce error. Accordingly, scanning range finders in accordance with some embodiments of the present disclosure may utilize faster 12-bit SAR converters, so that multiple samples can be taken on each target and signal processing methods can be used to help determine the correct range. In particular embodiments of the present disclosure, target acquisition includes the following operations:

1. The laser diode (element 440 shown in FIG. 4) is turned on and a return signal is received. The sampling does not yet occur, as there is a built-in timeout period to allow the BPF to settle.
2. The sampling period begins. Phase output and RSSI are sampled simultaneously for 64 samples. Samples are stored in memory, for example, via direct memory access (DMA).
3. The laser diode 440 is turned off and there is a buffer switch for the next sample. This is a ping-pong style buffering scheme. In particular, as operations 1 and 2 above are occurring, the range algorithm is applied to the previous set of samples. The sequence is: input samples into Buffer B, calculate on Buffer A, input samples into Buffer A, calculate on Buffer B, and repeat.
4. Calculate range—The average of both the phase and RSSI samples are determined. If the average RSSI is less than 10% above the noise floor, the range is considered to be bad and a zero is input to the scan buffer. If it is above 10%, the algorithm continues by applying the conversion determined in the calibration routine. The system is considered to be linear when RSSI is above 10%, and the basic equation y=mx+b is utilized, where y is the range, x is the average ADC count determined from operation 3 above, m is the slope determined during Mute Calibration and b is the offset determined from Offset Calibration. This value is stored in the scan buffer as the range.
5. Once a full scan is complete, the scan buffer is written and stored in another ping-pong style buffer. Only complete scans are sent to the host (element 411 shown in FIG. 4), so as Scan A is recorded, the previous Scan B is sent to the host 411. The buffers then switch so that Scan A will be sent to the host 411 while Scan B is being recorded.

Scanning optical range finders in accordance with some embodiments of the present disclosure may further include a high noise immunity 2-Pi phase detector, which may provide immunity from clock duty cycle deviation. For example, conventional analog multipliers and Exclusive-OR type phase detectors may be '1-Pi' (0-180 degree) phase detectors, whose non-edge triggered operation may yield high noise immunity (non-latching behavior during any given cycle); however, for round trip phase detection, the effective detection may be only 90 degrees. In addition, such 1-Pi phase detectors may not have the ability to discriminate phase for signals that are nearly in-phase, or for signals that are nearly 180 degrees out of phase if the reference and return signals do not have a exactly 50% duty cycle.

Some embodiments of the present disclosure address the above through the use of a quadrature or delayed reference clock fed to dual (2-Pi) phase detectors, which measure phase between the reference signal from the clock and the received signal. This configuration allows for discrimination as to whether the target is within the first or second phase wraparound 'window', and also allows for phase determination even if the reference or received signals do not have an exactly 50% duty cycle. Identifying and accounting for wraparound can be beneficial in applications such as lawn mowing where the laser range finder can receive signals reflected from objects located at a significant distance from the robot and can be beneficial in applications in which telepresence robots might be traveling along a long hallway or in a large room, such as a large conference room.

Scanning optical range finders in accordance with some embodiments of the present disclosure may also include a compact, efficient photon gathering system. As noted above with reference to FIGS. 1-3, optical systems found in scanning range finders are often based around imaging optical paths (whereby the light rays projected from the target to the optical detector map 1:1), which are typically not needed in single-pixel ranging systems dependent upon total light intensity. In addition, imaging optical systems may have inherent limitations regarding the placement tolerance of the optical elements. Also, the locations of the rays striking the detector may change with a non-bore-sighted optical path, and a degree of offset between transmit and receive optical paths may be necessary (for example, with phase detecting range finders, in which crosstalk is not tolerated).

In contrast, some embodiments of the present disclosure employ a more compact, non-imaging optical system for photon gathering with increased efficiency. In particular embodiments, instead of imaging-based optics, a compound parabolic concentrator (CPC) 125 (shown in FIGS. 1, 3 and 12A-12D) is used to direct light rays to an optical detector without defining an image of the source thereon. The CPC element allows for increased tolerance to optical element misalignment, gathering and directing photons onto the active area of an optical detector at larger angles of incidence, while maintaining the send-receive offset (a non-bore-sighted) optical path.

Scanning optical range finders in accordance with some embodiments of the present disclosure may further include a hybrid phase discriminating/Time-of-Flight (ToF) ranging system. In particular, phase shift-based range detection may inherently be more sensitive than pulse time of flight-based range detection, due for example to the noise immunity of the detection system afforded by the use of a bandpass filter and the averaging nature of the measurement acquisition. Phase shift measurement, however, typically employs a continuously modulated optical emitter/transmitter (such as the laser diode 440 of FIG. 4) and an averaging detector (such as the XOR—type phase detector 408 of FIG. 4), instead of direct ToF and single (or small number of) pulses. With a continuously modulated transmit signal, the phase shift of the return signal 'wraps around' every 90 degrees (180 full round trip with an XOR-type phase detector). As such, for phase-based detector systems, the phase shift for a long distance can cause aliasing to a shorter distance.

Figure 5A:
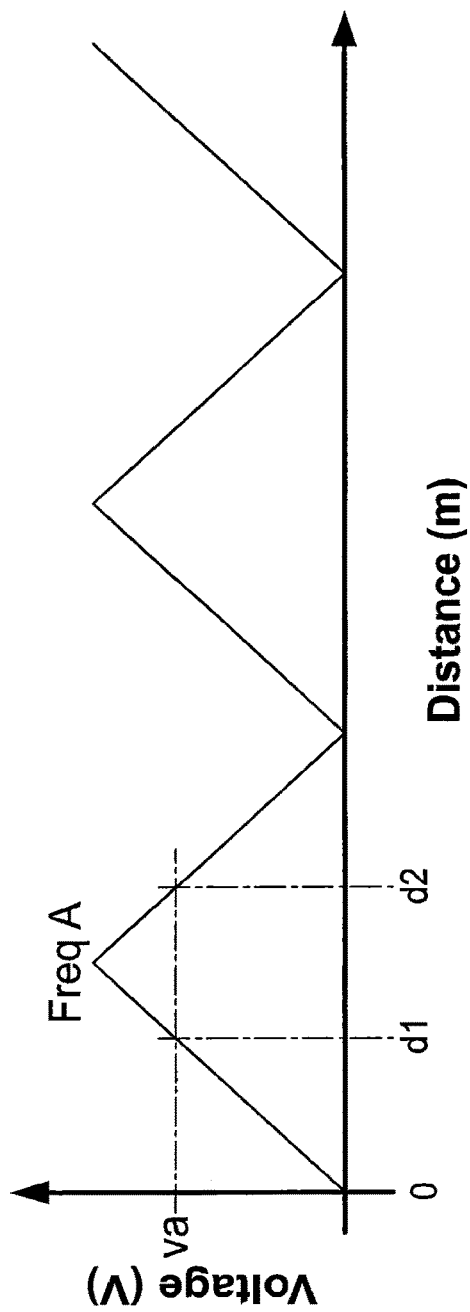
FIG. 5A is a graph illustrating phase wraparound in a detection signal.

FIG. 5A illustrates the concept of phase wraparound in greater detail. As shown in FIG. 5A, an average voltage va indicated by the phase shift of a return or received optical signal having a frequency Freq A corresponds to two distances, d1 and d2, which cannot be distinguished. Thus, a consequence of phase wraparound is that the distance beyond wraparound may appear as a closer distance. The wraparound distance may be dependent on the laser modulation frequency and the type of phase detector used. For example, with an XOR type phase detector (such as the phase detector 408 of FIG. 4), only 0-180° phase detection may be performed without ambiguity (round trip). However, the XOR type phase detector may allow for better linearity of phase voltage versus distance in the presence of noise than a latching edge-triggered phase detector (e.g., no jitter induced offset), and may be fully differential which provides electrical crosstalk reduction.

Figure 5B:
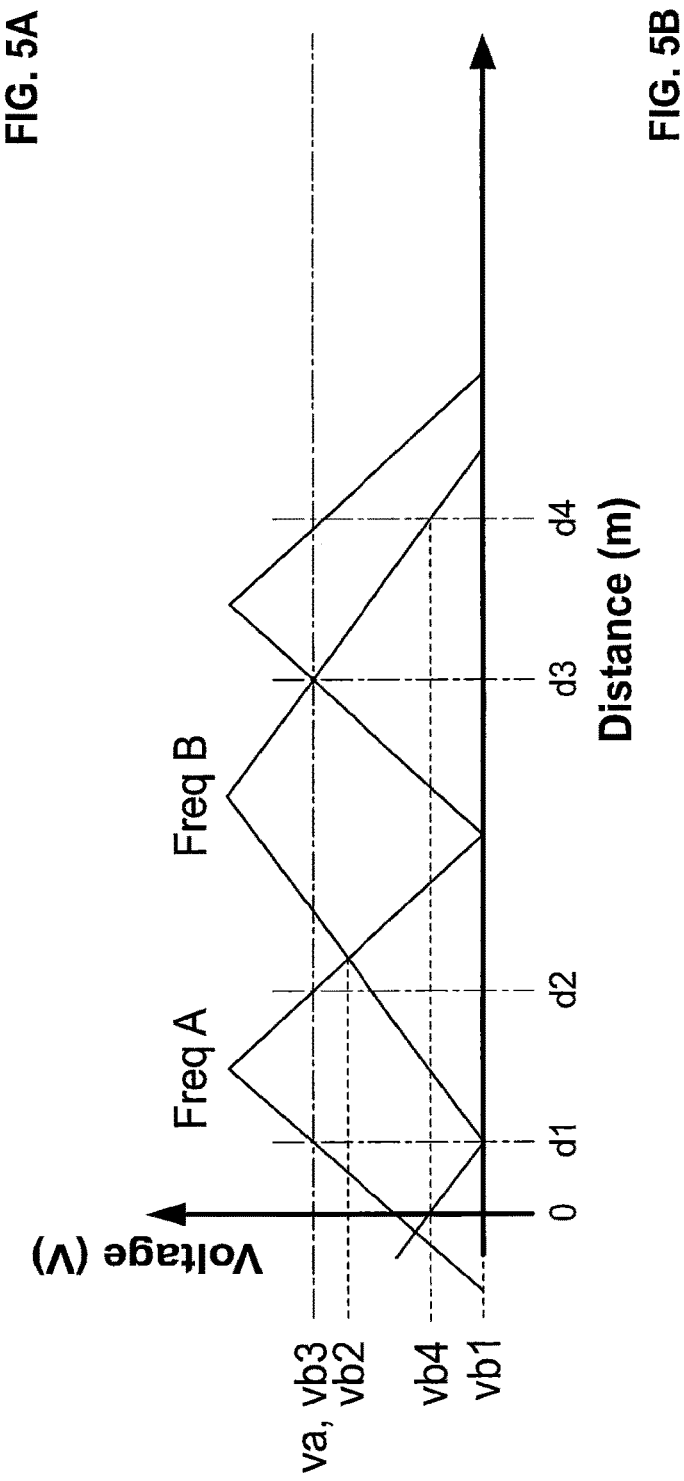
FIG. 5B is a graph illustrating operations for addressing phase wraparound in a detection signal according to some embodiments of the present disclosure.

As such, embodiments of the present disclosure provide several methods that allow an XOR-type phase detector to determine or identify in which 'wraparound window' a target resides. For example, with reference to FIG. 5B and FIG. 6B, phase wraparound may be addressed by emitting a second signal having a different, second frequency Freq B, which is deliberately phase shifted relative to the first signal having first frequency Freq A. In particular, as shown in FIG. 5B with reference to the range finder circuit 400 of FIG. 4, a scan is initiated by driving an optical emitter 440 to output a first signal at Freq A (Block 601). During the scan, the optical emitter 440 is switched to output the second signal at Freq B (Block 602). Return signals reflected from a target at both frequencies Freq A and Freq B are sampled by the optical detector 430 (Block 606), from which respective detection signals are generated (Block 611). These signals are used by the CPU 411 to calculate at least two distances for each detection signal (Block 616), representing the closest possible distance for each frequency. The calculated distances are compared (Block 617) and, if in agreement, are identified as the actual range or distance of the target (Block 618). If the calculated distances do not agree (Block 617), a least common multiple of the distances indicated by each frequency is calculated by the CPU 411, for example, by stepping the distances out in a leap-frog manner (Block 619). This least common multiple of the distances indicated by each frequency represents the actual range or distance of the target.

A combination of two signals having unique signatures can thereby be used to resolve wraparound. More particularly, with reference to FIG. 5B, return or received optical signals having different frequencies Freq A and Freq B are sampled and stored in memory as respective detection signals. Due to phase wraparound, the average voltage va of the return signal at Freq A is indicative of multiple distances d1, d2, d3, and d4. In order to resolve the distance, the sample voltage from the Freq B measurement is used. If, for example, the average voltage was found to be vb1, this would be indicative of d1. If instead it was found to be vb3, the resolution algorithm would calculate a distance of d1 for va, but find that the distance calculated from vb3 is d3. Since these do not match, the algorithm would step through the common multiples of the Freq A and Freq B wraparound distances until it found a common multiple at d3. This then would be chosen as the true distance of the target.

As such, some embodiments of the present disclosure may use signals having different frequencies, multiple receive paths, and a comparison of separate measurements to address phase wraparound. It will be understood that wraparound may still occur, albeit at the beat frequency of the two modulation frequencies. As lower frequencies have longer wraparound distances, wraparound can be pushed to greater than 100 m with proper selection of frequencies. In selecting frequencies, trade-offs may exist in that closer frequencies may result in a lower beat frequency, and therefore, longer wraparound. However, if the selected frequencies of the respective signals are too close together, they may be indistinguishable. For example, if Freq A and Freq B are similar, the average voltages va and vb will be nearly the same from one wraparound window to the next. Conversely, if the frequencies of the respective signals are too far apart, they may define two sides of a steep band pass filter BPF, so the farther away from the center, the more of the signals that may be discarded. In some embodiments frequencies approximately 200 kHz apart may be utilized. For example, frequencies on either side of 4 MHz, such as 3.9 MHz and 4.1 MHz, may be selected for Freq A and Freq B, respectively.

Also, the optical emitter may be dynamically switched between the discrete frequencies Freq A and Freq B to emit the multiple ranging signals sequentially. For example for a scan arc of 0.5 degrees, a 0.25 degrees of the arc may correspond to Freq A, and 0.25 degrees of the arc may correspond to Freq B. However, as the turret 110 is spinning during the sampling, it will be understood that in some instances the first sample set may correspond to a different target than the second sample set; nevertheless, embodiments of the present invention may provide accurate distances for many targets. Also, for dynamic switching, the sizes of the sample sets may be reduced for each frequency (as there is only half as much time to sample), which may result in noisier data sets. In addition, the calculated distances may never truly agree, as calculation based on sample set may indicate a slightly different distance than the other, and this error could be amplified through the wraparound zones.

It will be understood that, although described above primarily with reference to samples at two different frequencies Freq A and Freq B by way of example, more than two discrete frequencies may be utilized by embodiments of the present disclosure in a similar manner. Moreover, while discussed above with reference to sequentially switching between the discrete frequencies, it will be understood that embodiments of the present disclosure may utilize multiple optical emitters, each emitting signals at a different frequency, or a mixer to combine the frequencies for one optical emitter to simultaneously emit the signals used in the phase shift-based ranging measurements described herein.

Figure 5C:
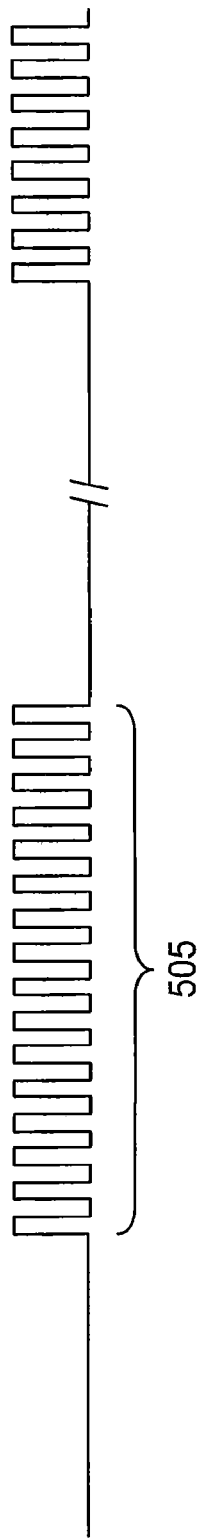
FIG. 5C is a graph illustrating operations for addressing phase wraparound in a detection signal according to some embodiments of the present disclosure.

FIG. 5C illustrates further methods for determining or identifying in which 'wraparound window' a target resides in accordance with embodiments of the present disclosure. Referring to FIG. 5C, phase shift measurements may be combined with pulse time of flight ranging measurements by using RSSI (received signal strength) and transmitting gated bursts 505 from the optical emitter to address phase wraparound. In particular, by observing the received signal at the optical detector and measuring the time delay between the beginning of the transmitted burst and the arrival of the received signal, the 'gross' phase shift or round trip time delay can be ascertained. In this way 'time of flight' is used to determine a coarse or raw 'phase window' target distance (i.e., wraparound discrimination), and long-term averaged phase shift is used for precise or fine distance measurement. In some embodiments, a second signal path may be used for the time-of-flight based measurement.

Combining phase shift and time of flight based ranging measurements to determine the phase wraparound window in which the target resides, as discussed above, may operate on the assumption that the RSSI rise time after being filtered by the bandpass filter is fast, or that the bandpass filter is low-Q and the RSSI signal exceeds a noise threshold level within a predictable time period. In particular, because a PIN photodiode based signal chain may result in a noisy RSSI signal, a bandpass filter (element 406 in FIG. 4) may be used for noise reduction/rejection; however, this may slow the RSSI rise time, making determination of the target window more difficult.

Figure 5D:
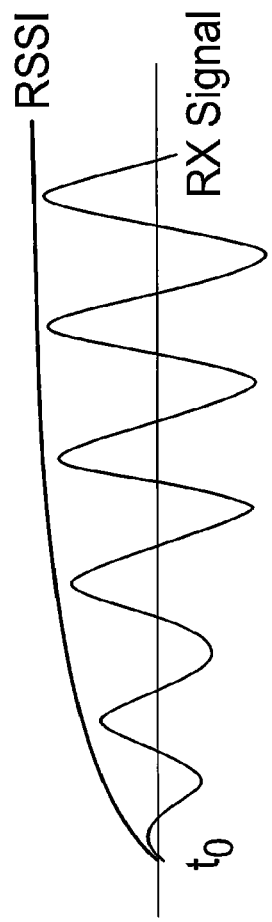
FIG. 5D is a graph illustrating operations for addressing phase wraparound in a detection signal according to some embodiments of the present disclosure.

Referring to FIG. 5D, to address difficulties in determining the target window due to the use of the bandpass filter, embodiments of the present disclosure may extrapolate the rising edge or beginning time $t_0$ of the burst based on the RSSI rise time from sampling the RSSI signal. In particular, the RSSI noise floor is sampled, and then the RSSI signal is sampled as the clock gate is removed. Based on the RSSI wave shape (envelope), sample amplitude vs. time is used to extrapolate the beginning $t_0$ of the rise of the RSSI signal due to the step function of the received signal from target. This calculation, while computationally intensive, is independent of signal strength, as long as the signal strength is sufficiently above the noise floor. The time $t_0$ is used to determine the time delay for the ToF calculation discussed above with reference to FIG. 5C.

Scanning optical range finders in accordance with some embodiments of the present disclosure may also provide dynamic range enhancement. In particular, as target reflectivity and distance may greatly vary, particularly in outdoor environments, the dynamic range of the received signal can be extremely large. In some embodiments, this large range of signal amplitudes may be addressed by passing the received signal through a logarithm amplifier (element 407 of FIG. 4). While the dynamic range of real world signals may exceed that of most log amps, the effective dynamic range of the system may be enhanced by sampling the RSSI signal early in the gated clock burst. If the signal strength exceeds a preset value, the transmitted signal modulation index can be decreased by the CPU (element 411 of FIG. 4). As such, the power level of the signal emitted by the optical emitter (element 440 of FIG. 4) may be dynamically changed, which may permit ranging at limits beyond the capability of the compression system. In an environment including some highly-reflective targets (such as retro-reflective beacons), the emitted signal power may be reduced for targets having higher-reflectivities and increased for targets having lower reflectivities, and the data sets collected at the different power levels may be merged for range calculations. Additionally or alternatively, if the RSSI signal is weak, the modulation index (i.e., signal strength or extinction ratio) can be increased so that non-compliant (poorly reflective) targets can be detected properly.

Figures 14A, 14B:
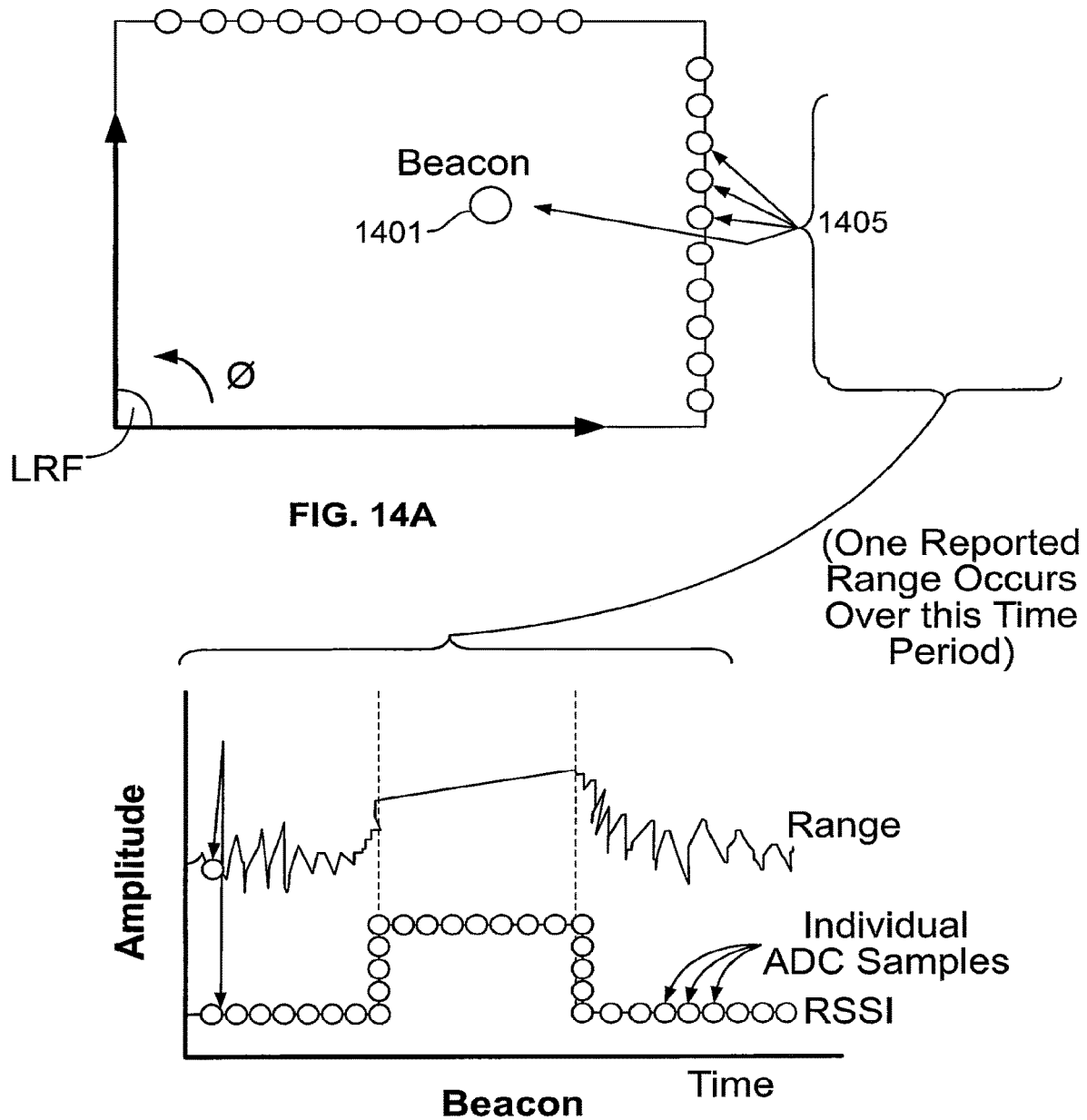
FIGS. 14A and 14B are a plot and a graph, respectively, illustrating operations for improving angular (heading) resolution to retro-reflective beacons in accordance with some embodiments of the present disclosure.

FIGS. 14A and 14B illustrate operations for improving angular (heading) resolution to retro-reflective beacons in accordance with some embodiments of the present disclosure. A range finder typically reports ranges for a given heading, where the headings are quantized at a particular granularity. FIG. 14A is a polar plot illustrating a plurality of range samples 1405 received in response to 256 pulses of the laser diode 440 with about 1° of synchronization over a scan angle φ, while the laser range finder (LRF) 100 is rotating at about 10 Hz (that is, one revolution in a tenth of a second). Reference designator 1401 indicates a retro-reflective beacon within the angle φ scanned by the laser range finder 100.

FIG. 14B is a graph of amplitude versus time of the laser scanning through the environment of FIG. 14A. One reported range from FIG. 14A occurs over the time period shown in FIG. 14B, and the samples in FIG. 14B represent individual ADC samples (which are received in response to individual pulses of the laser diode 440, with less than 1° of synchronization). As shown in FIG. 14B, as the laser output from the laser diode 440 sweeps over the beacon 1401, the amplitude of the range signal transitions from a relatively noisy level to a relatively stable level and back to a relatively noisy level, based on the higher reflectivity of the beacon 1401. Correspondingly, the amplitude of the received signal strength (RSSI) transitions from a lower level to a higher level and back to the lower level.

The range and RSSI signals shown in FIG. 14B illustrate that, while the amplitude of the range signal may require some time to settle due to the presence of noise, the amplitude of the RSSI signal settles much faster, and sharply transitions between the lower and higher levels/states to indicate the presence of the retro-reflective beacon 1401. When a beacon 1401 is present, the time distance between samples may be relatively fine, allowing for higher precision. In particular, in FIGS. 14A-14B, as each sample corresponds to about 1 degree, the distance between samples is less than 1 degree, allowing for improved resolution as to the location of the beacon 1401. The example of FIGS. 14A-14B illustrates a single-frequency sweep or scan; however, the signal strength/power and/or frequency of the laser diode output may be varied during the scan. The sweep can be performed on initial power-up in an area to verify boundaries, and/or to compare detected boundaries to stored boundaries from a previous scan.

In some embodiments, multiple sweeps or scans may be performed. For example, to identify the presence of a beacon 1401, a fast initial sweep (e.g., at a higher rotational frequency) over the angle φ may be performed. If an abrupt increase in signal strength (or abrupt decrease in noise) is indicated by the initial sweep, a subsequent sweep or scan can be performed at a slower rate to provide higher resolution or focus on an expected retro-reflective beacon location. That is, the subsequent scan may be performed at lower rotational frequency in one or more areas expected to contain retro-reflective beacons, as indicated from abrupt transitions in the initial sweep.

Based on the expected presence of a beacon, the signal strength for the output signal from the optical emitter may be dynamically increased in the one or more areas indicated from the initial sweep, to ensure that the received signal strength when detecting a beacon is above a desired threshold. In other words, the power to the laser diode 440 may be altered at certain portions of a subsequent, lower-speed scan to increase the RSSI amplitude (and thus, the accuracy of the ranging measurement) based on an indication of the presence of the beacon in the initial, higher-speed scan.

The power to the laser diode 440 can also be dynamically reduced to avoid reflection from diffuse targets at short ranges, which may be confused with reflection from a retro-reflective target when the return signal is strong. In particular, if a signal strength is known for a diffuse target, then a qualification can be made for signal strength vs. distance. For example, for a white target, signal strength vs. distance may be significantly less than for a retro-reflective target. Thus, thresholds can be set for the received signal strength, and the power to the optical emitter can be altered accordingly.

Scanning optical range finders in accordance with some embodiments of the present disclosure may also include a source-synchronous bandpass filter. As discussed above with reference to real-time calibration, the source clock frequency and bandpass filter peak frequency should be matched. While the clock frequency may be dynamically adjusted as described above, the bandpass filter (element 406 of FIG. 4) may be implemented using a switched capacitor filter in some embodiments. As such, if the clock for such a switched capacitor filter is derived from the system clock, then the bandpass filter peak frequency can be matched to the system clock frequency.

Scanning optical range finders in accordance with some embodiments of the present disclosure may further include automatic laser alignment calibration. In the laser range finding system, the optical path of the transmit beam should fall within the field of view of the receiving optical path. As such, the optical detector (such as the photodiode 130 of FIG. 1) may be replaced with a plurality of optical detectors (for instance, arranged in an array), each with their own range detecting circuitry, which can further reduce the alignment criticality of the transmit laser. Range detection can thereby occur wherever in the array of pixels the laser spot is focused (for example, by the optics 115, mirror block 120, and CPC element 125 of FIG. 1).

In some embodiments, the optical range finder may include an integrated circuit IC (such as the circuit 400 of FIG. 4) that enables fine control over the transmitter and acquisition system. In particular, the circuit may be configured to take samples at up to 1.8 kHz, to sample at 3.6 kHz or greater, to control the emitter bias and modulation current, to provide an indication of signal strength, to provide some raw indication of signal strength (raw voltage), to provide some raw indication of range (raw voltage), and/or to change the frequency of the optical emitter. The IC may be combined with the laser range finder optics (transmit and receive) and eye safety management.

Scanning optical range finders in accordance with some embodiment of the present disclosure may further allow for compensation of amplitude dependent timing errors (ADTEs). For example, there may be nonlinearities and/or other errors in range measurement systems that may not be accounted for in some of the methods described herein. In particular, because the phase delay through the system cannot be perfectly independent of signal amplitude, there may be range errors that are dependent on the signal amplitude. Errors of this type can be problematic, particularly in the receive signal chain due to the substantial dynamic ranges involved. However, such errors can also occur in the reference clock, particularly if the reference clock is derived electrically rather than optically. These errors are referred to herein as amplitude dependent timing errors (ADTEs).

If the reference clock is not generated optically (e.g., by monitoring photons emitted from the laser diode or other light source), some embodiments of the present disclosure may compensate for ADTEs in the transmit chain using a monitor photodiode that is often included in many laser diodes, by transmitting a known signal from the laser diode; measuring the optical power of the signal emitted from the laser diode, and at the same time, measuring the signal from the monitor photodiode; and storing the relationship between the monitor photodiode output level and laser diode output level. Once the relationship between the monitor photodiode output level and laser diode output level is known, it can be used to set the bias current level (such that the laser diode is above threshold) as well as the extinction ratio (i.e., peak power divided by bias power). Once the current through the laser diode is above threshold and the extinction ratio is maintained, the delay may be uniform and the ADTEs may be reduced to an acceptable level.

Some embodiments of the present disclosure may compensate for timing errors in the transmit chain when using laser diodes, LEDs, or other optical emitters that do not include a monitor photodiode, by monitoring the current through the optical emitter, and using the current as the signal source for the reference clock, as there may be a negligible delay between current flow through optical emitter and the photons being emitted. Also, in the receive signal chain, some embodiments of the present disclosure may compensate for ADTEs by measuring (or otherwise characterizing) RSSI and phase for various target reflectivities and distances, and generating a lookup table of these values. During optical detector operation, phase and RSSI voltages can be measured; however depending on the compensation scheme employed, the range that is reported may be an interpolated number from this lookup table. Thus the error for a given signal amplitude and phase delay can be subtracted from the original range estimate. The compensation schemes discussed above can be programmed into the sensor at the factory, and the compensation required can be determined for each sensor either by measurement of each sensor at the factory or for all sensors by characterization.

The flowchart and block diagrams in the figures illustrate the architecture, functionality, and operation of possible implementations of systems, methods, and/or computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The corresponding structures, materials, acts, and equivalents of any means or step plus function elements in the claims below are intended to include any disclosed structure, material, or act for performing the function in combination with other claimed elements as specifically claimed.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

The invention claimed is:

1. A mobile robot comprising:
an optical emitter circuit;
a non-imaging optical element arranged to receive distinct optical signals at an entrance aperture thereof responsive to operation of the optical emitter circuit and to direct the optical signals to an output aperture thereof, wherein the non-imaging optical element comprises a compound parabolic collector element;
an optical detector circuit configured to receive the optical signals from the output aperture of the non-imaging optical element and to generate respective detection signals based on respective phase differences of the optical signals relative to corresponding outputs of the optical emitter circuit;
a ranging circuit coupled to the optical detector circuit and configured to calculate a plurality of distances from the phase differences indicated by the detection signals, and to identify one of the plurality of distances as a range of a target; and
a rotatable turret comprising collection optics that are arranged to direct the optical signals to the compound parabolic collector element responsive to rotation of the turret,
wherein the optical emitter circuit is configured to sequentially switch the outputs of the optical emitter circuit between different frequencies during the rotation of the turret.

2. The mobile robot of claim 1, wherein the compound parabolic collector element comprises:
a parabolic surface defining the entrance aperture and the output aperture at opposing ends thereof; and
a flange extending around a periphery of the parabolic surface adjacent the entrance aperture thereof, the flange having a greater diameter than the entrance aperture and defining a lip protruding from the parabolic surface.

3. The mobile robot of claim 1, wherein the optical emitter circuit is configured to dynamically alter power levels of the outputs thereof during the rotation of the turret.

4. The mobile robot of claim 1, wherein the ranging circuit is configured to determine a time delay between transmission of one of the outputs from the optical emitter circuit and arrival of a corresponding one of the optical signals at the optical detector circuit, and to identify the one of the plurality of distances as the range of the target based on the time delay.

5. The mobile robot of claim 4, wherein the outputs from the optical emitter circuit respectively comprise a plurality of gated bursts, and wherein the ranging circuit is configured to determine a time of the arrival of the one of the optical signals based on a signal strength of a burst thereof exceeding a threshold.

6. The mobile robot of claim 5, wherein the ranging circuit is configured to extrapolate a rising edge of the burst of the one of the optical signals from the signal strength thereof to determine the time of the arrival.

7. The mobile robot of claim 6, wherein:
the optical detector circuit is configured to calculate a received signal strength indicator (RSSI) signal indicating the signal strength and to sample a received signal strength indicator (RSSI) noise floor to define the threshold; and
the ranging circuit is configured to extrapolate a time of the rising edge of the burst based on a rise time of the RSSI signal relative to the RSSI noise floor.

8. The mobile robot of claim 1, wherein the optical emitter circuit comprises a programmable frequency clock coupled to an optical emitter, and wherein the optical emitter circuit is configured to vary a frequency of the clock when the optical emitter is pointed at a fixed distance calibration target to output a plurality of calibration signals therefrom at respective frequencies, and is configured to dynamically adjust the clock to one of the respective frequencies corresponding to one of the calibration signals having a highest received signal strength indicated by the optical detector circuit.

9. The mobile robot of claim 8, wherein the respective frequencies comprise a current frequency of the clock, a frequency greater than the current frequency, and a frequency less than the current frequency, and wherein the optical emitter circuit is configured to set the frequency of the clock during operation of the mobile robot.

10. The mobile robot of claim 1, wherein the mobile robot is a robotic lawnmower comprising a drive to move the robotic lawnmower about a surface, wherein the target is positioned on the surface.

11. A mobile robot comprising:
an optical emitter circuit;
a non-imaging optical element arranged to receive distinct optical signals at an entrance aperture thereof responsive to operation of the optical emitter circuit and to direct the optical signals to an output aperture thereof;
an optical detector circuit configured to receive the optical signals from the output aperture of the non-imaging optical element and to generate respective detection signals based on respective phase differences of the optical signals relative to corresponding outputs of the optical emitter circuit; and a ranging circuit coupled to the optical detector circuit and configured to calculate a plurality of distances from the phase differences indicated by the detection signals, and to identify one of the plurality of distances as a range of a target, wherein the distinct optical signals have different frequencies and the ranging circuit is configured to calculate the range of the target based on a comparison of the plurality of distances indicated by the respective detection signals.

12. The mobile robot of claim 11, wherein:

the optical detector circuit comprises an averaging detector configured to output the respective detection signals representing average voltages based on the respective phase differences; and the ranging circuit is configured to calculate, for the respective detection signals, the plurality of distances from the average voltages thereof, and to identify the one of the plurality of distances as the range of the target based on a least common multiple thereof.

13. The mobile robot of claim 12, wherein the averaging detector is configured to output the respective detection signals representing the average voltages responsive to input signals thereto that are forced to a predetermined state.

14. The mobile robot of claim 11, wherein the optical emitter circuit is configured to provide a phase shift between the respective outputs thereof.

15. The mobile robot of claim 11, wherein the non-imaging optical element comprises a compound parabolic collector element, and further comprising:

a rotatable turret comprising collection optics that are arranged to direct the optical signals to the compound parabolic collector element responsive to rotation of the turret.

16. The mobile robot of claim 15, wherein the compound parabolic collector element comprises:

a parabolic surface defining the entrance aperture and the output aperture at opposing ends thereof; and a flange extending around a periphery of the parabolic surface adjacent the entrance aperture thereof, the flange having a greater diameter than the entrance aperture and defining a lip protruding from the parabolic surface.

17. The mobile robot of claim 15, wherein the optical emitter circuit is configured to sequentially switch the outputs thereof between different frequencies during the rotation of the turret.

18. The mobile robot of claim 15, wherein the optical emitter circuit is configured to dynamically alter power levels of the outputs thereof during the rotation of the turret.

19. The mobile robot of claim 15, wherein the mobile robot is a robotic lawnmower comprising a drive to move the robotic lawnmower about a surface, wherein the target is positioned on the surface.

20. The mobile robot of claim 11, wherein the ranging circuit is configured to determine a time delay between transmission of one of the outputs from the optical emitter circuit and arrival of a corresponding one of the optical signals at the optical detector circuit, and to identify the one of the plurality of distances as the range of the target based on the time delay.

* * * * *

UNITED STATES PATENT AND TRADEMARK OFFICE
CERTIFICATE OF CORRECTION

PATENT NO. : 10,845,481 B2
APPLICATION NO. : 16/012097
DATED : November 24, 2020
INVENTOR(S) : Travis Pierce, Jamie Milliken and Marc Wilga Page 1 of 1

It is certified that error appears in the above-identified patent and that said Letters Patent is hereby corrected as shown below:

In the Claims

Column 25, Line 9, in Claim 11, delete "frequencies" and insert -- frequencies, --, therefor.

Signed and Sealed this
Second Day of February, 2021

Drew Hirshfeld
*Performing the Functions and Duties of the*
*Under Secretary of Commerce for Intellectual Property and*
*Director of the United States Patent and Trademark Office*